United States Patent
Roth, II et al.

(10) Patent No.: US 11,686,627 B2
(45) Date of Patent: Jun. 27, 2023

(54) DISTRIBUTED ACTIVE MECHANICAL WAVEGUIDE SENSOR DRIVEN AT MULTIPLE FREQUENCIES AND INCLUDING FREQUENCY-DEPENDENT REFLECTORS

(71) Applicant: Etegent Technologies LTD., Cincinnati, OH (US)

(72) Inventors: Richard A. Roth, II, Goshen, OH (US); Stuart J. Shelley, Cincinnati, OH (US); Kevin Sigmund, Newtown, OH (US); Oleg Lobkis, Mason, OH (US)

(73) Assignee: ETEGENT TECHNOLOGIES LTD., Cincinnati, OH (US)

( * ) Notice: Subject to any disclaimer, the term of this patent is extended or adjusted under 35 U.S.C. 154(b) by 842 days.

(21) Appl. No.: 16/604,426

(22) PCT Filed: Apr. 10, 2018

(86) PCT No.: PCT/US2018/026935
§ 371 (c)(1),
(2) Date: Oct. 10, 2019

(87) PCT Pub. No.: WO2019/018021
PCT Pub. Date: Jan. 24, 2019

(65) Prior Publication Data
US 2021/0132008 A1    May 6, 2021

Related U.S. Application Data

(60) Provisional application No. 62/483,763, filed on Apr. 10, 2017.

(51) Int. Cl.
*G01K 11/24* (2006.01)
*G01L 1/10* (2006.01)
(Continued)

(52) U.S. Cl.
CPC ............ *G01K 11/24* (2013.01); *G01L 1/10* (2013.01); *G01L 11/06* (2013.01); *G01N 29/075* (2013.01);
(Continued)

(58) Field of Classification Search
CPC ........... G01K 11/24; G01L 1/10; G01L 11/06; G01N 29/44; G01N 29/42; H01P 3/10
See application file for complete search history.

(56) References Cited

U.S. PATENT DOCUMENTS

| | | |
|---|---|---|
| 801,130 A | 10/1905 | Barclay |
| 2,786,981 A | 3/1957 | Zaleski |

(Continued)

FOREIGN PATENT DOCUMENTS

| | | |
|---|---|---|
| DE | 2521411 A1 | 11/1976 |
| DE | 10200510011402 A1 | 9/2006 |

(Continued)

OTHER PUBLICATIONS

Kulite, Static-Dynamic Transducer, Jun. 17, 2009 (6 pages).
(Continued)

*Primary Examiner* — Paul M. West
(74) *Attorney, Agent, or Firm* — Gray Ice Higdon

(57) ABSTRACT

An active mechanical waveguide including an ultrasonically-transmissive material and a plurality of reflection points defined along a length of the waveguide may be driven at multiple resonant frequencies to sense environmental conditions, e.g., using tracking of a phase derivative. In addition, frequency-dependent reflectors may be incorporated into an active mechanical waveguide, and a drive frequency may be selected to render the frequency-dependent reflectors substantially transparent.

16 Claims, 14 Drawing Sheets

(51) Int. Cl.
  *G01L 11/06* (2006.01)
  *G01N 29/44* (2006.01)
  *H01P 3/10* (2006.01)
  *G01N 29/42* (2006.01)
  *G01N 29/07* (2006.01)
  *G10K 11/24* (2006.01)

(52) U.S. Cl.
  CPC ............ *G01N 29/42* (2013.01); *G01N 29/44* (2013.01); *G01N 29/4454* (2013.01); *G10K 11/24* (2013.01); *H01P 3/10* (2013.01); *G01N 2291/044* (2013.01)

(56) References Cited

U.S. PATENT DOCUMENTS

| | | |
|---|---|---|
| 2,968,943 A | 1/1961 | Statham |
| 3,071,974 A | 1/1963 | Peterson |
| 3,079,800 A | 3/1963 | Brooks |
| 3,201,735 A | 8/1965 | Brown et al. |
| 3,584,327 A | 6/1971 | Murry et al. |
| 3,915,018 A | 10/1975 | Karplus |
| 3,940,637 A | 2/1976 | Ohigashi et al. |
| 4,100,809 A | 7/1978 | Bobrov |
| 4,102,195 A * | 7/1978 | Thompson ............ G01K 11/26 73/579 |
| 4,149,422 A | 4/1979 | Olsen et al. |
| 4,165,651 A | 8/1979 | Olsen et al. |
| 4,165,652 A | 8/1979 | Olsen et al. |
| 4,233,843 A | 11/1980 | Thompson et al. |
| 4,336,719 A | 6/1982 | Lynnworth |
| 4,414,652 A | 11/1983 | Crist |
| 4,452,334 A | 6/1984 | Rogers |
| 4,499,438 A | 2/1985 | Cornelius et al. |
| 4,603,942 A | 8/1986 | Chang et al. |
| 4,610,551 A | 9/1986 | Shah |
| 4,650,346 A | 3/1987 | Tehon |
| 4,663,965 A | 5/1987 | Metcalf et al. |
| 4,667,097 A | 5/1987 | Fasching et al. |
| 4,676,663 A | 6/1987 | Tehon |
| 4,743,752 A | 5/1988 | Olsen et al. |
| 4,743,870 A | 5/1988 | Jen et al. |
| 4,783,997 A | 11/1988 | Lynnworth |
| 4,800,316 A | 1/1989 | Ju-Zhen |
| 4,823,600 A | 4/1989 | Biegel et al. |
| 4,939,457 A | 7/1990 | Tellerman |
| 5,003,825 A | 4/1991 | Lew |
| 5,022,014 A | 6/1991 | Kulczyk et al. |
| 5,044,769 A | 9/1991 | Kulczyk et al. |
| 5,159,838 A | 11/1992 | Lynnworth |
| 5,545,984 A | 8/1996 | Gloden et al. |
| 5,670,720 A | 9/1997 | Clark et al. |
| 5,713,916 A | 2/1998 | Dias |
| 5,792,949 A | 8/1998 | Hewelt et al. |
| 5,821,430 A | 10/1998 | Kwun et al. |
| 5,821,743 A | 10/1998 | Page et al. |
| 5,897,569 A | 4/1999 | Kellogg et al. |
| 5,962,790 A | 10/1999 | Lynnworth et al. |
| 6,047,602 A | 4/2000 | Lynnworth |
| 6,081,638 A | 6/2000 | Zhou |
| 6,185,155 B1 | 2/2001 | Steinich |
| 6,232,769 B1 | 5/2001 | Brunsch et al. |
| 6,281,976 B1 | 8/2001 | Taylor et al. |
| 6,343,511 B1 | 2/2002 | Lynnworth et al. |
| 6,413,103 B1 | 7/2002 | Merz et al. |
| 6,513,103 B1 | 1/2003 | Garlepp et al. |
| 6,611,081 B1 | 8/2003 | Okazaki et al. |
| 6,889,552 B2 | 5/2005 | Nguyen et al. |
| 6,912,907 B2 | 7/2005 | Fujimoto |
| 6,919,779 B2 | 7/2005 | Raphalovitz et al. |
| 6,975,179 B2 | 12/2005 | Harris |
| 7,016,047 B2 | 3/2006 | May |
| 7,017,415 B2 | 3/2006 | Harrold et al. |
| 7,162,925 B2 | 1/2007 | Dietrich |
| 7,258,014 B2 | 8/2007 | Rudkin |
| 7,414,410 B2 | 8/2008 | Pharn et al. |
| 7,450,021 B1 | 11/2008 | Gehm et al. |
| 7,454,978 B2 | 11/2008 | Schroeder et al. |
| 7,952,360 B2 | 5/2011 | Ganesh |
| 8,297,835 B2 | 10/2012 | Girbig et al. |
| 8,390,402 B2 | 3/2013 | Kunes |
| 9,048,521 B2 | 6/2015 | Larsen et al. |
| 9,182,306 B2 | 11/2015 | Roth, II et al. |
| 9,472,840 B2 | 10/2016 | Herbsommer et al. |
| 10,352,778 B2 | 7/2019 | Larsen et al. |
| 2002/0130253 A1 | 9/2002 | Yashiro et al. |
| 2003/0056595 A1 | 3/2003 | Harrold et al. |
| 2004/0119552 A1 | 6/2004 | Wray |
| 2005/0012431 A1 | 1/2005 | Andie |
| 2005/0144955 A1 | 7/2005 | Handelsman et al. |
| 2005/0238301 A1 | 10/2005 | Russell et al. |
| 2006/0290356 A1 | 12/2006 | Pharn et al. |
| 2007/0068256 A1* | 3/2007 | Xu ..................... G01N 29/024 73/579 |
| 2008/0090023 A1 | 4/2008 | Nayar et al. |
| 2008/0023219 A1 | 9/2008 | Kojima et al. |
| 2008/0232197 A1 | 9/2008 | Kojima et al. |
| 2008/0307885 A1 | 12/2008 | Ravitch et al. |
| 2009/0038904 A1 | 2/2009 | Bosk |
| 2009/0314088 A1 | 12/2009 | Djordjevic et al. |
| 2011/0314919 A1 | 12/2011 | Ehlert |
| 2012/0242426 A1 | 9/2012 | Larsen et al. |
| 2012/0026667 A1 | 10/2012 | Mueller et al. |
| 2012/0266676 A1 | 10/2012 | Mueller et al. |
| 2012/0325018 A1 | 12/2012 | Roth, II et al. |
| 2014/0144156 A1 | 5/2014 | Lang et al. |
| 2015/0175095 A1 | 6/2015 | Inao et al. |
| 2015/0377836 A1 | 12/2015 | Lanza et al. |
| 2016/0273973 A1 | 9/2016 | Larsen et al. |
| 2016/0294033 A1 | 10/2016 | Larsen et al. |
| 2017/0030871 A1 | 2/2017 | Lobkis et al. |
| 2019/0157733 A1 | 5/2019 | Larsen et al. |
| 2020/0240937 A1 | 7/2020 | Landy et al. |

FOREIGN PATENT DOCUMENTS

| | | |
|---|---|---|
| DE | 102007062864 A1 | 6/2009 |
| EP | 0053036 A1 | 6/1982 |
| EP | 0467818 A1 | 1/1992 |
| EP | 1014525 A1 | 6/2000 |
| EP | 1238715 A1 | 9/2002 |
| EP | 1566815 A2 | 8/2005 |
| EP | 2194325 A1 | 6/2010 |
| GB | 2114297 A | 8/1983 |
| JP | 61061027 A | 3/1986 |
| WO | WO2001035133 A1 | 5/2001 |
| WO | WO2007136040 A1 | 11/2007 |
| WO | WO 2013053699 | 4/2013 |
| WO | WO2015/066494 A2 | 5/2015 |
| WO | WO2015/099884 A2 | 7/2015 |
| WO | WO2016016631 A1 | 2/2016 |
| WO | WO2016162880 A1 | 10/2016 |
| WO | WO2015157488 A1 | 2/2017 |
| WO | WO2018/191290 A1 | 10/2018 |
| WO | WO 2018/226310 A2 | 12/2018 |
| WO | WO2019018021 A2 | 1/2019 |

OTHER PUBLICATIONS

Hunter, Gary W., Development and Application of High Temperature Sensors and Electronics, NASA Glenn Research Center, Cleveland, OH (26 pages).

Kurtz, Dr. Anthony D., "Miniature Absolute Pressure Transducer," AFSBIR, Control No. F031-1261 (2003).

Ned, Alexander A.; Kurtz, Dr. Anthony D.; Masheeb, Fawzia; Beheim, Glenn, Leadless SiC Pressure Sensors for High Temperature Applications, 2001 (6 pages).

Ned, Alexander A.; Kurtz, Anthony D.; Beheim, Glenn; Masheeb, Fawzia; Stefanescu, Sorin; Improve SiC Leadless Pressure Sensors for High Temperature Low and High Pressure Applications; Kulite Semiconductor Products, Inc., presented at the 21st Transducer Workshop, Lexington Park, MD, Jun. 22-23, 2004 (7 pages).

(56) References Cited

OTHER PUBLICATIONS

Wijesundara, Muthu, Recent Progress in SiC Sensors and Microsystems for Harsh Environments (19 pages).

Inagaki, K.; Kolosov, O.V.; Briggs, G. A. D.; Wright, O. B.; Waveguide ultrasonic force microscopy at 60 MHz; Applied Physics Letters, vol. 76, No. 14, Apr. 3, 2000 (3 pages).

Schuet, S; Wheeler, K.; Timucin, D.; Kowalski, M.; Wysocki, P.; Introduction & Motivation Characterization of Chafing Damage Model Based Inference, Model Based Inference for Wire Chafe Diagnostics, Intelligent Systems Division, NASA Ames Research Center, Moffett Field, California, Aging Aircraft 2009 (30 pages).

Rose, Joseph L., A Baseline and Vision of Ultrasonic Guided Wave Inspection Potential, Journal of Pressure Vessel Technology, Aug. 2002, vol. 124, pp. 273-282.

Neill, Ian T.; Oppenheim, I. J.; Greve, D.W.; A Wire-Guided Transducer for Acoustic Emission Sensing, Sensors and Smart Structures Technologies for Civil, Mechanical, and Aerospace Systems, 2007, Proc. of SPIE vol. 6529 652913-1 (8 pages).

Stobbe, David M., Acoustoelasticity in 7075-T651 Aluminum and Dependence of Third Order Elastic Constants on Fatigue Damage, A thesis Presented to the Academic Faculty, School of Mechanical Engineering, Georgia Institute of Technology, Aug. 2005 (91 pages).

Ali, M.G.S., Analysis of Broadband Piezoelectric Transducers by Discrete Time Model, Egypt. J. Sol., vol. (23), No. (2), (2000), pp. 287-295.

Greve, David W.; Sohn, Hoon; Yue, C. Patrick; Oppenheim, Irving J., An Inductively Coupled Lamb Wave Transducer, IEEE Sensors Journal, vol. 7, No. 2, Feb. 2007, pp. 295-301.

Huang, Bin; Shung, K. Kik, Characterization of very high frequency transducers with wire target and hydrophone, Institute of Physics Publishing, Journal of Physics: Conference Series 1 (2004) 161-166.

Hollman, Kyle W.; Holland, Mark R.; Miller, James G.; Nagy, Peter B.; Rose, James H., Effective Ultrasonic transmission coefficient for randomly rough surfaces, J. Acoust. Soc. Am. 100 (2), Pt. 1, Aug. 1996, pp. 832-839.

Kwun, Hegeon; Bartels, Keith A.; Hanley, John J., Effects of tensile loading on the properties of elastic-wave propagation in a strand, J. Acoust. Soc. Am 103 (6), Jun. 1998, pp. 3370-3375.

Nieuwenhuis, J. H.; Neumann, J.; Greve, D.W.; Oppenheim, I.J., Generation and detection of guided waves using PZT wafer transducers, Nov. 2005 (19 pages).

Chaki, S.; Bourse, G., Guided ultrasonic waves for non-destructive monitoring of the stress levels in prestressed steel strands, Ultrasonics 49 (2009) 162-171.

Li, Qiuhua; Lieh, Junghsen; Mayer, A, Large deflection of laminated circular plates with clamed edge and uniform loading, Proc. IMechE vol. 219 Part E: J. Process Mechanical Engineering (2005) (6 pages).

Sheplak, Mark; Dugundji, John, Large Deflections of Clamped Circular Plates Under Initial Tension and Transitions to Membrane Behavior, Journal of Applied Mechanics, 1998 (28 Pages).

Behbahani, Alireza R., Need for Robust Sensors for Inherently Fail-Safe Gas Turbine Engine Controls, Monitoring, and Prognostics, May 7, 2006 through Thursday, May 11, 2006, ISA2006, 52nd International Instrumentation Symposium—Cleveland, OH (37 pages).

Di Scalea, Francesco Lanza; Rizzo, Piervincenzo; Seible, Frieder, Stress Measurement and Defect Detection in Steel Strands by Guided Stress Waves, Journal of Materials in Civil Engineering © ASCE/May/Jun. 2003, pp. 219-227.

Miklowitz, Julius, The Theory of Elastic Waves and Waveguides, North-Holland Series in Applied Mathematics and Mechanics, vol. 22, 1978 (634 pages).

Nagy, Peter B.; Kent, Renee M., Ultrasonic assessment of Poisson's ratio in thin rods, J. Acoust. Soc. Am. 98 (5), Pt. 1, Nov. 1995, pp. 2694-2701.

Konkov, E., Ultrasonic Interferometer for High-Accuracy Linear Measurements, Measurement Science Review, vol. 9, No. 6, 2009, pp. 187-188.

Nicholson, N.C. and McDicken, W.N., "Waveguides in medical ultrasonics: effect of waveguide medium upon model amplitude," Ultrasonics 1992 vol. 30, No. 2. (pp. 82-86).

Spratt, William K.; Vetelino, John F.; Lynnworth, Lawrence C., "Torsional Ultrasonic Waveguide Sensor," 2010 IEEE International Ultrasonics Symposium Proceedings (pp. 702-706).

Loveday, Philip W., "Analysis of Piezoelectric Ultrasonic Transducers Attached to Waveguides Using Waveguide Finite Elements," IEEE Transactions on Ultrasonics, Ferroelectrics, and Frequency Control, vol. 54, No. 10, Oct. 2007 (pp. 2045-2051).

Lee, Jung-Ryul and Tsuda, Hiroshi, "Sensor application of fibre ultrasonic waveguide," Meas. Sci. Technol. 17 (2006) pp. 645-652.

Cegla, F.B.; Cawley, P., "Ultrasonic Waveguides for Remote High Temperature NDT," Non-Destructive Testing Group, Department of Mechanical Engineering, Imperial College London SW7 2AZ, United Kingdom.

Redwood, Martin, Mechanical waveguides; the propagation of acoustic and ultrasonic waves in fluids and solids with boundaries, New York, Pergamon Press. 1960.

U.S. Appl. No. 16/604,431, filed Oct. 10, 2019.

U.S. Appl. No. 16/604,434, filed Oct. 10, 2019.

U.S. Patent and Trademark Office, Office Action issued in U.S. Appl. No. 16/604,434, dated Sep. 16, 2021.

U.S Patent and Trademark Office, Office Action issued in U.S. Appl. No. 16/604,431, dated Feb. 7, 2022.

Transmittal of Related Apps.

U.S. Patent and Trademark Office, Notice of Allowance issued in U.S. Appl. No. 16/604,431, dated Jul. 27, 2022.

\* cited by examiner

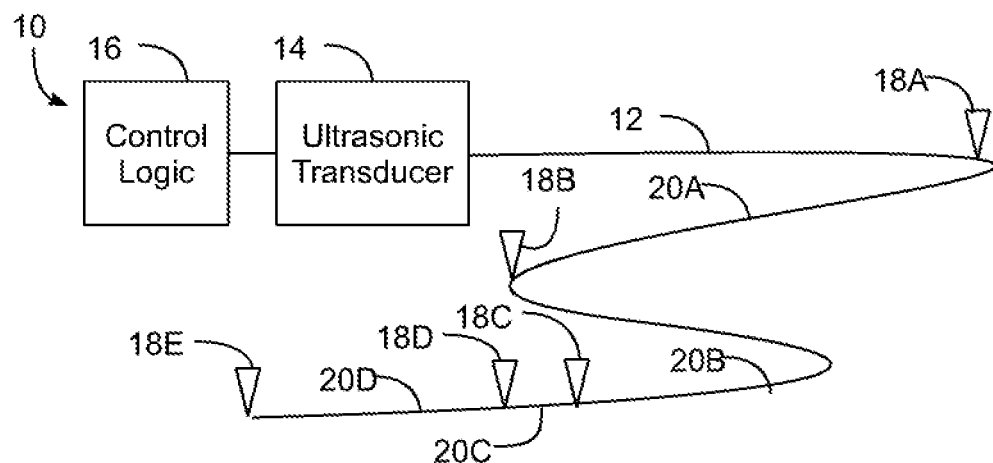
FIG. 1
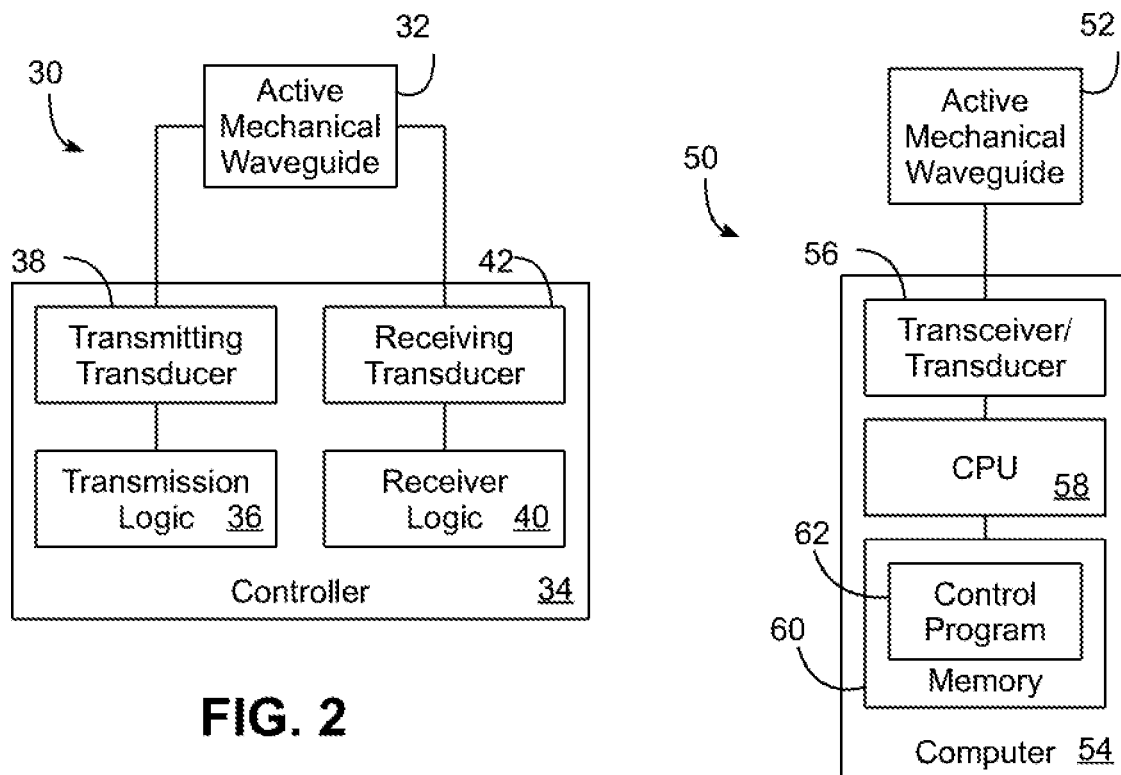
FIG. 2
FIG. 3

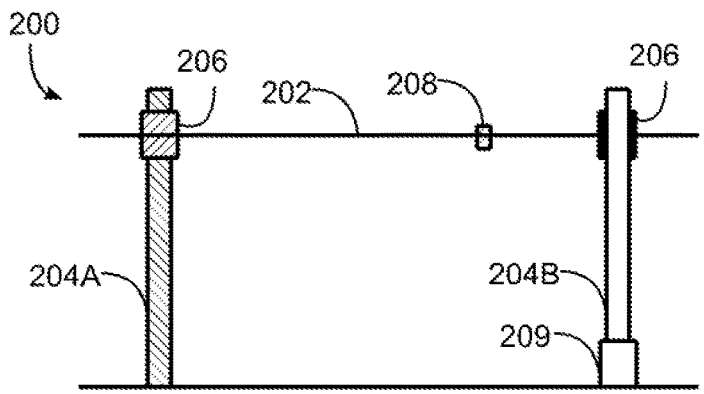
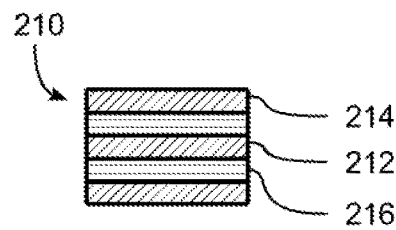
FIG. 7
FIG. 8
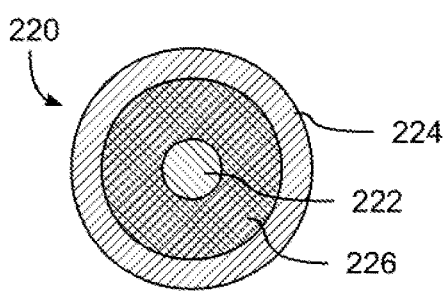
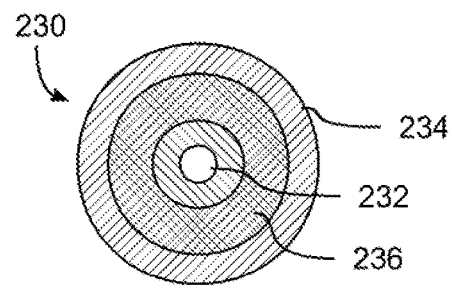
FIG. 9
FIG. 10
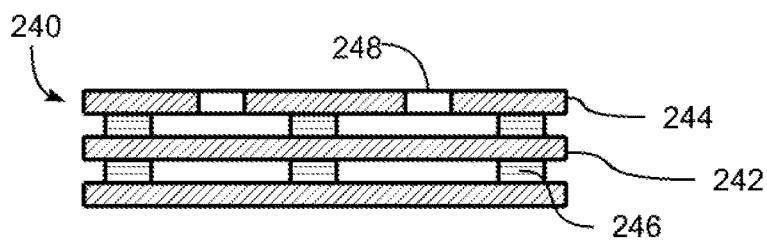
FIG. 11
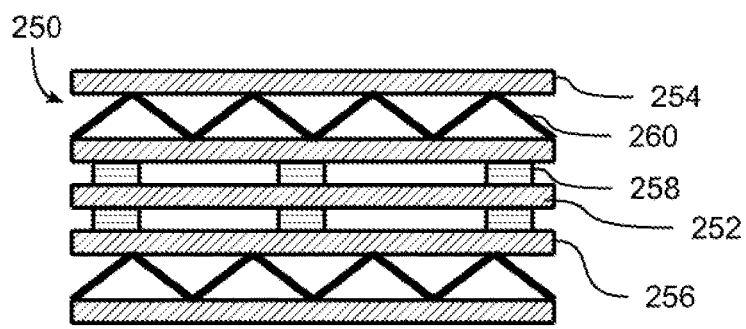
FIG. 12

DISTRIBUTED ACTIVE MECHANICAL WAVEGUIDE SENSOR DRIVEN AT MULTIPLE FREQUENCIES AND INCLUDING FREQUENCY-DEPENDENT REFLECTORS

GOVERNMENT RIGHTS

Certain aspects of this invention were made with government support under Grant/Contract No. N68335-11-C-0385 awarded by the Naval Air Warfare Center (NAVAIR). The U.S. Government may have certain rights in the invention.

FIELD OF THE INVENTION

The present invention relates to ultrasonic sensing technology, and more particularly to sensors and sensing methods using active mechanical waveguides.

BACKGROUND OF THE INVENTION

Many conventional mechanical systems are monitored to determine operating conditions such as pressure, temperature, vibrations, etc. However, in many systems it is desirable to monitor and measure operating conditions at locations in the system where it is extremely difficult to do so. For example, the measurement environment may be a harsh environment in which sensors are unable to operate reliably. For example, monitoring an aero gas turbine engine presents unique challenges due to the harsh environmental conditions of the engine, i.e., high temperatures, high pressures, and high vibrations a sensor is subjected to during operation of the engine. In mechanical systems, conventional sensors used to monitor operating conditions in harsh environments often fail at an extremely high rate and lead to high maintenance costs in maintaining the mechanical system due to limits associated with the materials required to construct the sensors. In addition, conventional sensors typically require a variety of materials to be bonded together, which can complicate sensor design due to the varying environmental condition limits of these materials and different coefficients of thermal expansion that can result in high thermal stresses, and which can lead to increased failure rates or lower performance due to some required materials having low environmental condition limits.

Conventional methods of dealing with the above issues typically involve acknowledging the limits associated with a sensor, the lifetime of the sensor, and that its lifetime and measurement capabilities are limited by the environment within which it is configured. In some systems, conventional methods of dealing with the above issues typically involve installing a sensor in a location remote from the desired sensing location and estimating operating conditions at the desired sensing location based on the data collected from the remote position.

Sensors have also been developed utilizing a single material to minimize thermal strains and the challenges associated with bonding dissimilar materials, as well as one or more wires coupled to and/or integrated with the sensors and functioning as active waveguides through which ultrasonic signals may be propagated and sensed to measure the environmental conditions, e.g., pressure, force, strain, temperature, etc., to which the sensors are subjected. In some instances, the wires may be tensioned and/or coupled to one or more diaphragms such that pressure differences or other forces deflect the diaphragms and induce varying tension and/or elongation of the wires, which in turn vary the ultrasonic signal transmission characteristics of the wires in a measurable manner.

Nonetheless, in some instances, various environmental conditions can contribute to the ultrasonic signal transmission characteristics of the wires used as active waveguides, resulting in a need to compensate for or otherwise minimize the effects of some environmental conditions when attempting to measure other environmental conditions.

In addition, in some instances, generating and detecting ultrasonic energy in the wires used as active waveguides, and in particular, transmitting ultrasonic energy to an active waveguide wire from a transducer and/or receiving ultrasonic energy from an active waveguide wire with a receiver can be subject to energy losses and unwanted reflections that reduce signal strength and signal to noise ratio.

Consequently, there is a continuing need for improved sensors and sensing methods to address these and other difficulties with conventional sensor technology.

SUMMARY OF THE INVENTION

Embodiments of the invention are generally directed to various improvements in the excitation and/or compensation in an active mechanical waveguide, e.g., as used with sensors that measure environmental conditions using ultrasonic energy, generally in the form of mechanical stress waves propagated through a waveguide formed on an ultrasonically-transmissive material.

Therefore, consistent with one aspect of the invention, a sensor for sensing an environmental condition in an environment may include an active mechanical waveguide including an ultrasonically-transmissive material, and control logic coupled to the active mechanical waveguide and configured to drive the waveguide with ultrasonic energy, process an ultrasonic signal propagated through the waveguide in response to the ultrasonic energy, track a phase derivative of the ultrasonic signal, and determine a value for an environmental condition based upon the tracked phase derivative of the ultrasonic signal.

Also, in some embodiments, the control logic is further configured to determine a phase inflection point frequency from the tracked phase derivative. and determine the value for the environmental condition based upon the tracked phase derivative of the ultrasonic signal by determining the value for the environmental condition based upon the determined phase inflection point frequency. Moreover, in some embodiments, the active mechanical waveguide includes a plurality of reflection points defined along a length of the waveguide to define a plurality of sensing regions along the waveguide. and the control logic is configured to determine a value for the environmental condition for each of the plurality of sensing regions based upon the tracked the phase derivative of the ultrasonic signal.

Consistent with another aspect of the invention, a method of sensing an environmental condition in an environment may include driving an active mechanical waveguide including an ultrasonically-transmissive material with ultrasonic energy, processing an ultrasonic signal propagated through the waveguide in response to the ultrasonic energy, tracking a phase derivative of the ultrasonic signal, and determining a value for an environmental condition based upon the tracked phase derivative of the ultrasonic signal.

In addition, some embodiments may also include determining a phase inflection point frequency from the tracked phase derivative, and determining the value for the environmental condition based upon the tracked phase derivative of the ultrasonic signal by determining the value for the environmental condition based upon the determined phase inflection point frequency. In some embodiments, the active mechanical waveguide includes a plurality of reflection points defined along a length of the waveguide to define a plurality of sensing regions along the waveguide, and the method further includes determining a value for the environmental condition for each of the plurality of sensing regions based upon the tracked the phase derivative of the ultrasonic signal.

Consistent with another aspect of the invention, a sensor for sensing an environmental condition in an environment may include an active mechanical waveguide including an ultrasonically-transmissive material and a plurality of reflection points defined along a length of the waveguide to define a plurality of sensing regions along the waveguide. and control logic coupled to the active mechanical waveguide and configured to drive the waveguide to track a plurality of resonant frequencies of the waveguide.

Moreover, in some embodiments, the control logic is further configured to determine a first value of an environmental condition for a first sensing region among the plurality of sensing regions by determining a first resonant frequency among the plurality of resonant frequencies, and to determine a second value of the environmental condition for a second sensing region among the plurality of sensing regions by determining a second resonant frequency among the plurality of resonant frequencies. In some embodiments, the control logic includes a positive feedback loop that drives the waveguide using the plurality of resonant frequencies. In addition, some embodiments may further include an ultrasonic transducer coupled to the waveguide and configured to propagate ultrasonic stress waves through the waveguide, and a receiver coupled to the waveguide and configured to receive an ultrasonic signal propagated through the waveguide in response to the ultrasonic stress waves generated by the ultrasonic transducer, where the control logic is coupled to the ultrasonic transducer and the receiver and is configured to determine a value of an environmental condition for each of the plurality of sensing regions based upon the plurality of resonant frequencies of the received ultrasonic signal. In some embodiments, each of the plurality of resonant frequencies is non-harmonic relative to others of the plurality of resonant frequencies.

Consistent with another aspect of the invention, a method of sensing an environmental condition in an environment may include tracking a plurality of resonant frequencies of an active mechanical waveguide including an ultrasonically-transmissive material and a plurality of reflection points defined along a length of the waveguide to define a plurality of sensing regions along the waveguide, and sensing the environmental condition at one or more of the plurality of sensing regions based upon the tracked plurality of resonant frequencies.

In addition, in some embodiments, sensing the environmental condition includes determining a first value of the environmental condition for a first sensing region among the plurality of sensing regions by determining a first resonant frequency among the plurality of resonant frequencies, and determining a second value of the environmental condition for a second sensing region among the plurality of sensing regions by determining a second resonant frequency among the plurality of resonant frequencies. Further, in some embodiments. tracking the plurality of resonant frequencies includes driving the waveguide in a positive feedback loop using the plurality of resonant frequencies. In addition, in some embodiments, the active mechanical waveguide includes an ultrasonic transducer configured to propagate ultrasonic stress waves through the waveguide and a receiver configured to receive an ultrasonic signal propagated through the waveguide in response to the ultrasonic stress waves generated by the ultrasonic transducer. Further, in some embodiments, each of the plurality of resonant frequencies is non-harmonic relative to others of the plurality of resonant frequencies.

Consistent with another aspect of the invention, a sensor network for sensing environmental conditions in an environment may include an active mechanical waveguide including an ultrasonically-transmissive material, and control logic coupled to the active mechanical waveguide and configured to drive the waveguide to track first and second resonant frequencies and to determine a first value for a first environmental condition from the first resonant frequency and determine a second value for a second environmental condition from the second resonant frequency.

In addition, in some embodiments, the active mechanical waveguide includes a plurality of reflection points defined along a length of the waveguide to define at least first and second sensing regions along the waveguide, and the control logic is configured to determine the first value for the first environmental condition for the first sensing region and determine the second value for the second environmental condition for the second sensing region. Also, in some embodiments, each of the first and second environmental conditions is temperature. In some embodiments, each of the first and second environmental conditions is selected from the group consisting of temperature, strain, force, vibration, pressure, or acceleration. In addition, in some embodiments, the waveguide includes a sensing region, where the first and second environmental conditions are different from one another, and where the control logic determines the first value for the first environmental condition for the sensing region and determines the second value for the second environmental condition for the sensing region.

Consistent with another aspect of the invention, a method of sensing environmental conditions in an environment may include tracking first and second resonant frequencies of an active mechanical waveguide including an ultrasonically-transmissive material, determining a first value for a first environmental condition from the first resonant frequency, and determining a second value for a second environmental condition from the second resonant frequency.

Further, in some embodiments, the active mechanical waveguide includes a plurality of reflection points defined along a length of the waveguide to define at least first and second sensing regions along the waveguide, determining the first value includes determining the first value for the first sensing region, and determining the second value includes determining the second value for the second sensing region. In some embodiments, each of the first and second environmental conditions is temperature. Moreover, in some embodiments, each of the first and second environmental conditions is selected from the group consisting of temperature, strain, force, vibration, pressure, or acceleration. In addition, in some embodiments, the waveguide includes a sensing region, the first and second environmental conditions are different from one another, and determining the first value for the first environmental condition includes determining the first value for the sensing region and determining the second value for the second environmental condition includes determining the second value for the sensing region.

Consistent with another aspect of the invention, a sensor for sensing an environmental condition in an environment may include an active mechanical waveguide including an ultrasonically-transmissive material and a frequency-dependent reflector defined along a length of the waveguide, an ultrasonic transducer coupled to the waveguide and configured to propagate ultrasonic stress waves through the waveguide, and control logic coupled to the ultrasonic transducer and configured to control a drive frequency for the ultrasonic transducer to render the frequency-dependent reflector substantially transparent.

In some embodiments, the frequency-dependent reflector is defined by a reflection point defined along the length of the waveguide. Also, in some embodiments, the frequency-dependent reflector is defined by a coupling between the waveguide and a waveguide support. In addition, in some embodiments, the frequency-dependent reflector is defined by a seal through which the waveguide projects. In some embodiments, the frequency-dependent reflector is defined by a joint coupling together first and second members of the waveguide.

In addition, in some embodiments, the frequency-dependent reflector is defined at an end of the waveguide. Moreover, in some embodiments, the frequency-dependent reflector is defined at least in part by a hole in the end of the waveguide. Further, in some embodiments, the frequency-dependent reflector is further defined by a material disposed in the hole. In some embodiments, the waveguide is cylindrical, and where the frequency-dependent reflector is defined at least in part by an internal hole proximate the end of the waveguide.

In addition, in some embodiments, the first member includes a sensor portion including one or more reflection points defining one or more sensing regions, the second member includes a lead-in that is substantially more flexible and/or thinner than the first member, and the frequency-dependent reflector is further defined by an intermediate member between the first and second members and having a width that is between that of the first member and that of the second member. Moreover, in some embodiments, the frequency-dependent reflector is substantially transparent at a first frequency, the frequency-dependent reflector is defined by an intermediate member defined by first and second steps, and the first frequency at which the frequency-dependent reflector is substantially transparent is determined at least in part on a geometry of the intermediate member.

Also, in some embodiments, the first frequency at which the frequency-dependent reflector is substantially transparent is determined at least in part on a length and a width of the intermediate member. In some embodiments, the first frequency at which the frequency-dependent reflector is substantially transparent is determined at least in part on a modulus and/or density of a material of the frequency-dependent reflector. Also, in some embodiments, a reflectance of the frequency-dependent reflector is determined at least in part on loss factor of the frequency-dependent reflector.

Moreover, in some embodiments, the active mechanical waveguide includes a plurality of frequency-dependent reflectors that are substantially transparent at different frequencies, and the control logic is configured to drive the ultrasonic transducer at a plurality of frequencies to render different frequency-dependent reflectors substantially transparent to different drive frequencies of the ultrasonic transducer, and to determine a value of the environmental condition based upon an ultrasonic signal sensed from the waveguide when at least one of the plurality of frequency-dependent reflectors is substantially transparent to at least one of the different drive frequencies of the ultrasonic transducer. In some embodiments, the control logic is configured to concurrently drive the ultrasonic transducer at the plurality of frequencies. Moreover, in some embodiments, the control logic is configured to individually drive the ultrasonic transducer at each of the plurality of frequencies.

Consistent with another aspect of the invention, a method of sensing an environmental condition in an environment may include driving an ultrasonic transducer coupled to an active mechanical waveguide including an ultrasonically-transmissive material and a frequency-dependent reflector defined along a length of the waveguide, and controlling a drive frequency for the ultrasonic transducer to render the frequency-dependent reflector substantially transparent.

In some embodiments, the frequency-dependent reflector is defined by a reflection point defined along the length of the waveguide. Further, in some embodiments, the frequency-dependent reflector is defined by a coupling between the waveguide and a waveguide support. Moreover, in some embodiments, the frequency-dependent reflector is defined by a seal through which the waveguide projects. Also, in some embodiments, the frequency-dependent reflector is defined by a joint coupling together first and second members of the waveguide.

In some embodiments, the first member includes a sensor portion including one or more reflection points defining one or more sensing regions, the second member includes a lead-in that is substantially more flexible and/or thinner than the first member, and the frequency-dependent reflector is further defined by an intermediate member between the first and second members and having a width that is between that of the first member and that of the second member. Also, in some embodiments, the frequency-dependent reflector is substantially transparent at a first frequency, the frequency-dependent reflector is defined by an intermediate member defined by first and second steps, and the first frequency at which the frequency-dependent reflector is substantially transparent is determined at least in part on a geometry of the intermediate member.

Moreover, in some embodiments, the first frequency at which the frequency-dependent reflector is substantially transparent is determined at least in part on a length and a width of the intermediate member. Also, in some embodiments, the first frequency at which the frequency-dependent reflector is substantially transparent is determined at least in part on a modulus and/or density of a material of the frequency-dependent reflector. Further, in some embodiments, a reflectance of the frequency-dependent reflector is determined at least in part on loss factor of the frequency-dependent reflector.

Also, in some embodiments, the active mechanical waveguide includes a plurality of frequency-dependent reflectors that are substantially transparent at different frequencies, the method further including driving the ultrasonic transducer at a plurality of frequencies to render different frequency-dependent reflectors substantially transparent to different drive frequencies of the ultrasonic transducer, and determining a value of the environmental condition based upon an ultrasonic signal sensed from the waveguide when at least one of the plurality of frequency-dependent reflectors is substantially transparent to at least one of the different drive frequencies of the ultrasonic transducer. Moreover, in some embodiments, driving the ultrasonic transducer at the plurality of frequencies includes concurrently driving the ultrasonic transducer at the plurality of frequencies. In addition, in some embodiments, driving the ultrasonic transducer at the plurality of frequencies includes individually driving the ultrasonic transducer at each of the plurality of frequencies.

Consistent with another aspect of the invention, a sensor for sensing an environmental condition in an environment may include an active mechanical waveguide including an ultrasonically-transmissive material and a plurality of reflection points defined along a length of the waveguide to define a plurality of sensing regions along the waveguide. a plurality of support members supporting the waveguide along at least a portion of the length of the waveguide, where each support member defines a frequency-dependent reflector, and an ultrasonic transducer coupled to the waveguide and configured to propagate ultrasonic stress waves through the waveguide using a drive frequency to which the frequency-dependent reflector of at least one support member is substantially transparent.

Some embodiments may also include control logic coupled to the ultrasonic transducer and configured to control the drive frequency for the ultrasonic transducer to render the frequency-dependent reflector of the at least one support member substantially transparent. Moreover, in some embodiments, the control logic is further configured to determine a value of an environmental condition for each of the plurality of sensing regions based upon an ultrasonic signal propagated through the waveguide in response to the ultrasonic stress waves generated by the ultrasonic transducer.

Further, in some embodiments, each of the plurality of support members is cantilevered and extends generally transverse to a portion of the waveguide. In addition, in some embodiments, the plurality of support members support the waveguide in a generally arcuate shape. Also, in some embodiments, the environment is a generally cylindrical region of a gas turbine engine defined by inner and outer walls, and the plurality of support members extend inwardly from the outer wall or outwardly from the inner wall to support the waveguide in the generally arcuate shape within the generally cylindrical region.

Further, in some embodiments, the frequency-dependent reflector of the at least one support member is substantially transparent at a first frequency, the frequency-dependent reflector is defined by an intermediate member defined by first and second steps, and the first frequency at which the frequency-dependent reflector is substantially transparent is determined at least in part on a geometry of the intermediate member. Also, in some embodiments, the first frequency at which the frequency-dependent reflector of the at least one support member is substantially transparent is determined at least in part on a length and a width of the intermediate member. Moreover, in some embodiments, the first frequency at which the frequency-dependent reflector of the at least one support member is substantially transparent is determined at least in part on a modulus and/or density of a material of the frequency-dependent reflector of the at least one support member. In addition, in some embodiments, a reflectance of the frequency-dependent reflector of the at least one support member is determined at least in part on loss factor of the frequency-dependent reflector of the at least one support member.

Consistent with another aspect of the invention, a method of sensing an environmental condition in an environment may include driving an ultrasonic transducer coupled to an active mechanical waveguide including an ultrasonically-transmissive material and supported along at least a portion thereof by a plurality of support members, where each support member defines a frequency-dependent reflector, and controlling a drive frequency for the ultrasonic transducer to render the frequency-dependent reflector of at one support member substantially transparent.

Moreover, in some embodiments, the active mechanical waveguide includes a plurality of reflection points defined along a length of the waveguide to define a plurality of sensing regions along the waveguide, the method further including determining a value of an environmental condition for each of the plurality of sensing regions based upon an ultrasonic signal propagated through the waveguide in response to the ultrasonic stress waves generated by the ultrasonic transducer. Further, in some embodiments, each of the plurality of support members is cantilevered and extends generally transverse to a portion of the waveguide. In some embodiments, the plurality of support members support the waveguide in a generally arcuate shape, where the environment is a generally cylindrical region of a gas turbine engine defined by inner and outer walls, and the plurality of support members extend inwardly from the outer wall or outwardly from the inner wall to support the waveguide in the generally arcuate shape within the generally cylindrical region. Also, in some embodiments, the frequency-dependent reflector of the at least one support member is substantially transparent at a first frequency, the frequency-dependent reflector is defined by an intermediate member defined by first and second steps, and the first frequency at which the frequency-dependent reflector is substantially transparent is determined at least in part on a geometry of the intermediate member.

In some embodiments, the first frequency at which the frequency-dependent reflector of the at least one support member is substantially transparent is determined at least in part on a length and a width of the intermediate member. In addition, in some embodiments, the first frequency at which the frequency-dependent reflector of the at least one support member is substantially transparent is determined at least in part on a modulus and/or density of a material of the frequency-dependent reflector of the at least one support member. Further, in some embodiments, a reflectance of the frequency-dependent reflector of the at least one support member is determined at least in part on loss factor of the frequency-dependent reflector of the at least one support member.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is an illustration of an example distributed active mechanical waveguide sensor consistent with some embodiments of the invention.

FIG. 2 is a block diagram of one embodiment of an apparatus including an active mechanical waveguide consistent with some embodiments of the invention.

FIG. 3 is a block diagram of another embodiment of an apparatus including an active mechanical waveguide consistent with some embodiments of the invention.

FIG. 7 is a functional view of an example mounting structure for a distributed active mechanical waveguide sensor consistent with some embodiments of the invention, and with a portion of one support member cut away.

FIG. 8 is a lengthwise cross-sectional view of a portion of an example active mechanical waveguide incorporating a braided damping configuration.

FIG. 9 is an axial cross-sectional view of another example active mechanical waveguide incorporating a tubular damping configuration.

FIG. 10 is an axial cross-sectional view of another example active mechanical waveguide incorporating a concentric damping configuration with a tubular waveguide.

FIG. 11 is a lengthwise cross-sectional view of another example active mechanical waveguide incorporating ports and O-rings.

FIG. 12 is a lengthwise cross-sectional view of another example active mechanical waveguide incorporating dual concentric tubes.

DETAILED DESCRIPTION

Figure 4A:
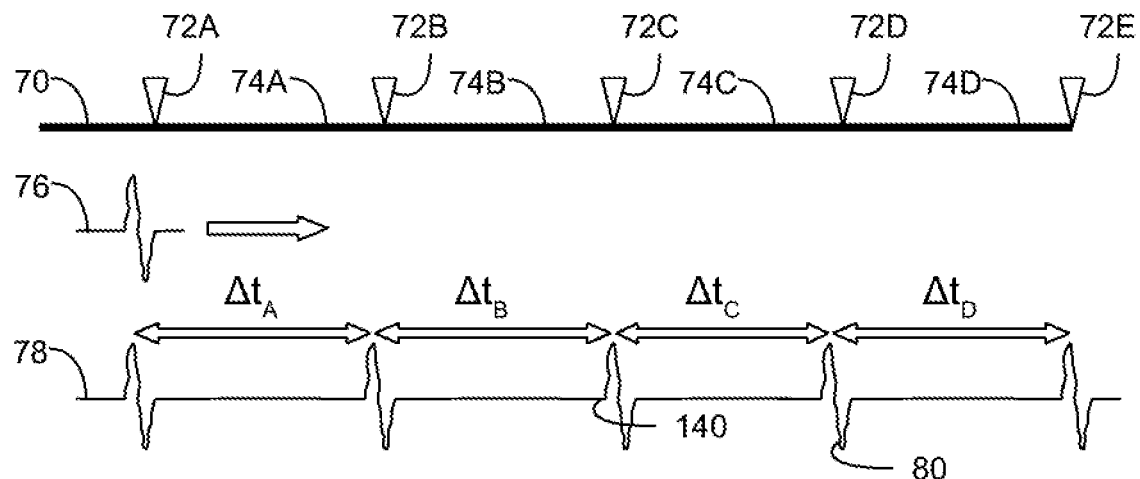
FIG. 4A illustrates the propagation and reflection of an ultrasonic pulse in an example distributed active mechanical waveguide temperature sensor consistent with some embodiments of the invention.

Embodiments of the invention are generally directed to various improvements related to an active mechanical waveguide sensor and a sensing method, in which signals communicated over a waveguide formed of an ultrasonically-transmissive material such as one or more wires are monitored such that environmental conditions may be measured based at least in part on characteristics of the communicated signals, where the environmental conditions include conditions such as pressure, force, temperature, acceleration, strain, and/or vibration. Further details regarding various waveguide sensor designs and techniques that may utilize the herein-described improvements are described in U.S. Pat. No. 9,048,521 to Larsen et al., U.S. Pat. No. 9,182,306 to Roth, II et al., U.S. Patent Publication Nos. 2016/0294033 and 2016/0273973 by Larsen et al., and U.S. Patent Publication No. 2017/0030871 by Lobkis et al., all of which are assigned to Etegent Technologies Ltd. (the same assignee as the present application), and which are incorporated by reference herein in their entirety.

Sensors consistent with some embodiments of the invention may be constructed of a single material, thereby minimizing thermal strains and challenges associated with bonding dissimilar materials. Moreover, some embodiments of the invention may be constructed using a variety of materials, thereby allowing selection of one or more construction materials based on material properties. An ultrasonically-transmissive material used in a waveguide consistent with some embodiments may include one or more wires of varying dimensions and/or cross-sections, which wires may be flexible in some embodiments or rigid (e.g., configured as rods) in other embodiments. Such wires may be plastically deformed or bent in some embodiments, and in some embodiments may be smaller gauges (e.g., configured as wire filaments).

Suitable ultrasonically-transmissive materials for use as wires or otherwise in a waveguide include, for example, metals and alloys such as steel, stainless steel alloys, titanium and titanium alloys, nickel and nickel alloys, cobalt alloys, super-alloys (e.g. Inconel® variations, Hastelloy® variations or Hayes® variations), refractory metals such as tungsten, platinum and iridium and their alloys, ceramics such as aluminum oxide, zirconium oxide, and silicon carbide, crystalline materials such as sapphire, and other materials, and which may or may not be suitable for use in harsh environments (i.e. high temperature, high pressure, and/or high vibration environments, or based on causticity, erosiveness, corrosiveness, oxidation, etc.). Selection of such materials may be based, for example, based upon the manner in which ultrasonic energy (e.g., in the form of stress waves) propagates through the materials.

Furthermore, while some embodiments of a waveguide include wires comprising a uniform construction, other embodiments may include wires advantageously comprising braided constructions, where braided constructions may provide higher tensile strengths, more flexibility or preferential damping at high frequencies in some embodiments. Uniformly constructed and braided wires comprising diameters between about 0.001 inches and 0.50 inches, or more particularly diameters between 0.005 inches and 0.25 inches may be used in some embodiments. In addition, the cross-sectional shapes of wires may vary in different embodiments, although in many embodiments, the cross-sectional shapes in many embodiments may include shapes that may be configured to transmit ultrasonic signals consistent with embodiments of the invention, including, for example substantially circular cross-sectional wires, substantially rectangular cross-sectional wires, substantially ribbon cross-sectional wires, aerodynamic cross-sections, etc.

Some sensors may also include additional structure, including, for example, support members, housings, diaphragms, attachment plates, sealing plates, etc., and such additional structure may be formed of various materials and/or combinations of materials including, for example, metals and alloys such as steel, stainless steel alloys, titanium and titanium alloys, nickel and nickel alloys, cobalt alloys, super-alloys (e.g. Inconel® variations, Hastelloy® variations or Hayes® variations), refractory metals such as tungsten, platinum and iridium and their alloys, ceramics such as aluminum oxide. zirconium oxide, and silicon carbide, crystalline materials, and other materials, and which may or may not be suitable for use in harsh environments (i.e. high temperature, high pressure, and/or high vibration environments, or based on causticity, erosiveness, corrosiveness, oxidation, etc.). It will be appreciated that housings, diaphragms, attachment plates and wires in a single sensor design may all be constructed of the same material in some embodiments, while in other embodiments, heterogeneous materials may be used for some of these components.

Embodiments consistent with the present invention may utilize ultrasonic signals, e.g., in the form of ultrasonic stress waves, and measure environmental conditions based at least in part on the ultrasonic signals. Ultrasonic signals may generally be transmitted over a large distance, which enables equipment associated with an ultrasonic sensor to be located remote from the desired sensing location, while still being able to measure environmental conditions at the desired sensing location by utilizing sensors consistent with embodiments of the invention positioned in the desired sensing location. In some embodiments (referred to herein as "active" sensors), the ultrasonic signals may be propagated through a waveguide in response to ultrasonic stress waves generated by an ultrasonic transducer, e.g., a piezoelectric element, while in other embodiments (referred to herein as "passive" sensors), the ultrasonic signals may be generated by the environment and propagated along the waveguide for sensing.

In some embodiments of the invention, for example, a sensor may be configured such that a sensing portion of the sensor extends into or otherwise within an environment subjected to an environmental condition to be measured. In one embodiment, for example, a sensor may be used to measure temperature in a gas turbine engine using a sensor portion formed of a wire that extends through an interior region (e.g., a generally cylindrical region within the engine) of the gas turbine engine. The speed of sound in any medium is generally temperature dependent due to changing elastic modulus; therefore, the measurement of ultrasonic velocity between two points may be used as a temperature measurement with appropriate calibration. Furthermore, temperature changes may also cause expansion or contraction of a waveguide and thereby effectively alter the length of a waveguide between the two points in addition to a change in the modus of the material. In some embodiments, for example, a difference in propagation time between two ultrasonic reflections, e.g., as may be generated at the end of a sensor portion and at a notch formed in the sensor portion (as the end of the sensor portion will also generally operate as a reflection point), or otherwise generated at two reflection points formed in a waveguide, may be used to determine (with the appropriate calibration) an average temperature between the reflection points, and generally such a measurement is insensitive to the temperature anywhere else along a waveguide.

Further, in some embodiments multiple reflection points may be defined along the length of a waveguide to define multiple sensing regions along the waveguide, with pairs of reflection points defining different sensing regions such that the difference in propagation time between ultrasonic reflections generated at the reflection points bounding a particular sensing region may be used to determine temperature or another environmental condition for that particular sensing region.

Systems and methods consistent with various aspects of the invention may be utilized to transmit and sense ultrasonic signals. In some embodiments, an ultrasonic signal may be transmitted through a waveguide, and the sensed ultrasonic signal may include a reflection or echo of the transmitted ultrasonic signal. In some embodiments, an ultrasonic signal may be transmitted through a waveguide, and the sensed ultrasonic signal may include a portion of the transmitted ultrasonic signal. In some embodiments, an ultrasonic signal may be transmitted through a waveguide, and the sensed ultrasonic signal may be a modification of the transmitted ultrasonic signal. In other embodiments, a waveguide may have a first end and a second end, and an ultrasonic signal may be transmitted through the waveguide at the first end, and an ultrasonic signal may be sensed through the waveguide at a second end, and the sensed ultrasonic signal may be based at least in part on the transmitted ultrasonic signal, while in other embodiments, both the transmission of an ultrasonic signal and the sensing of an ultrasonic signal may be performed proximate the same end a waveguide. The frequency of a transmitted ultrasonic signal may vary in different embodiments, although in many embodiments, a transmitted ultrasonic signal of between about 100 KHz and about 50 MHz, or more particularly a signal of less than about 1 MHz, may be used.

Turning to the drawings, where like numbers denote like parts throughout the several views, FIG. 1 illustrates an example distributed active mechanical waveguide sensor 10 suitable for use in connection with various of the embodiments discussed herein. Sensor 10 in this embodiment includes a mechanical waveguide 12, e.g., implemented as a wire, which is coupled to an ultrasonic transducer 14 controlled by control logic 16 to both propagate ultrasonic stress waves along mechanical waveguide 12 and sense or receive an ultrasonic signal generated in response to the ultrasonic mechanical stress waves. It will be appreciated, however, that in other embodiments, separate transducers may be used to generate the ultrasonic mechanical stress waves and sense or receive the ultrasonic signals responsive thereto, Waveguide wire 20 also includes a plurality of reflection points 18A-18E formed along the length of the waveguide wire, and defining a number of sensing regions 20A-20D therebetween. Of note, reflection points 18A-18D are specifically formed along the waveguide wire, while reflection point 18E represents the end of the waveguide wire. A reflection point defining a sensing region may be created by introducing a notch on the sensor, adding a sleeve, stepping up/down in cross-section, or otherwise modifying the geometry and/or material properties in the waveguide wire in some way such that a change in acoustic impedance occurs and an ultrasonic stress wave is both reflected and transmitted from this point. As such, it will be appreciated that multiple sensing regions 20A-20D may be created on the same sensor "network," allowing multiple regions to be sensed simultaneously. In addition, it will be appreciated that in some embodiments the end of waveguide wire 20 may be configured to dampen or otherwise reduce reflections from the end of the waveguide wire, such that no sensing region is defined between the end of the waveguide wire and the last reflection point.

In embodiments including a common transmitting and receiving end, such as the sensor shown in FIG. 1, a pulse/echo transmitting and sensing method may be utilized. In these embodiments, an ultrasonic signal, in the form of mechanical stress waves, may be transmitted through waveguide wire 12, and an ultrasonic signal may be sensed and received from waveguide wire 12, where the sensed ultrasonic signal may comprise an echo of the transmitted ultrasonic signal, and including multiple reflections returned by the various reflection points 18A-18E. As will become more apparent below, analysis of the reflections in the sensed ultrasonic signal may be used to determine environmental conditions for some or all of the sensing regions 20A-20D.

Sensor 10 is specifically configured as a temperature sensor; however, it will be appreciated that a distributed active mechanical waveguide sensor consistent with the invention may be used to measure other environmental conditions, including for example, heat flux, strain, pressure, force, acceleration, etc., and further, may sense different environmental conditions for different sensing regions such that multiple environmental conditions may be measured by the same sensor.

FIG. 2 illustrates an example apparatus 30 consistent with embodiments of the invention and to measure an environmental condition in a sensing location, which may or may not be in a harsh environment. Apparatus 30 may include an active mechanical waveguide 32 coupled to a controller 34. In this embodiment, controller 34 includes separate transmission and receiver logic 36, 40, as well as separate transmitting and receiving transducers 38, 42, e.g., coupled to opposite ends of waveguide 32. Thus, unlike sensor 10 of FIG. 1, ultrasonic energy is introduced at one end of waveguide 32 and sensed at the other end thereof, and a transmission characteristic such as propagation delay, time of flight between pulses, etc., may be used to sense an environmental condition. In this embodiment, transmission logic 36 generates an ultrasonic excitation signal that is received by transmitting transducer 38 and used by transducer 38 coupled to one end of wire 34 to impart ultrasonic energy in the form of ultrasonic mechanical stress waves corresponding to the excitation signal to the waveguide. Receiving transducer 42 coupled to the other end of the waveguide demodulates the ultrasonic energy propagated through the waveguide and generates a return signal that is transmitted to receiver logic 40, which then processes the return signal to determine the environmental condition.

FIG. 3 illustrates an alternate apparatus 50 consistent with other embodiments of the invention and to measure an environmental condition in a sensing location using an active mechanical waveguide 52 coupled to a computer 54 including transceiver/transducer logic 56, a central processing unit 58 including at least one processor, and a memory 60 within which is stored a control program 62 that, when executed, both generates a signal that causes excitation of waveguide 52 with ultrasonic energy as well as processes a return signal that is representative of the propagated ultrasonic signal to determine the environmental condition.

As should be apparent from FIGS. 2-3, various hardware and/or software configurations may be utilized to implement the herein-described functionality, and may include dedicated hardware logic disposed in one or more electronic circuits and/or integrated circuits, and/or programmable logic and/or a programmable electronic device such as a computer that executes program code. In addition, in some embodiments, processing may be implemented using approaches other than a computer, such as analog preprocessing and a timer. Furthermore, it should be appreciated that the functionality associated with generating an excitation signal, exciting a wire to impart ultrasonic energy and stress waves to the wire in response to such an excitation signal, receiving, detecting or sensing the propagated ultrasonic energy (whether transmitted or reflected), generating a return signal representative of such propagated ultrasonic energy, and processing the return signal to calculate a measurement for an environmental condition. and compensate for other environmental conditions and effects may be combined or separated in various embodiments consistent with the invention.

In addition, any software routines executed to implement the embodiments disclosed herein, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, embedded hardware. etc., and that, when read and executed by one or more processors in a computer, cause that computer to perform the steps necessary to execute steps or elements embodying desired functionality. Moreover, while some embodiments have and hereinafter will be described in the context of fully functioning computers and computer systems, those skilled in the art will appreciate that some embodiments are capable of being distributed as a program product in a variety of forms, and that the invention applies equally regardless of the particular type of computer readable media used to actually carry out the distribution, including, for example, computer readable storage media, which is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

In addition, as is generally known in the field, signal processing methods including filtering, demodulation, and Hilbert transform processing methods may be used to determine one or more ultrasonic signal transmission characteristics. In some embodiments, an apparatus may perform one or more signal processing operations on the ultrasonic signal sensed on a wire to determine one or more ultrasonic signal transmission characteristics of the wire as well as the variance of one or more ultrasonic signal transmission characteristics of the wire.

Those skilled in the art will recognize that the example environments illustrated in FIGS. 1-3 are not intended to limit the invention. Indeed, other modifications that may be made to the aforementioned embodiments, e.g., as described in the aforementioned publications incorporated by reference herein, will be apparent to one of ordinary skill in the art having the benefit of the instant disclosure.

Distributed Active Mechanical Waveguide Temperature Sensor

Figure 4B:
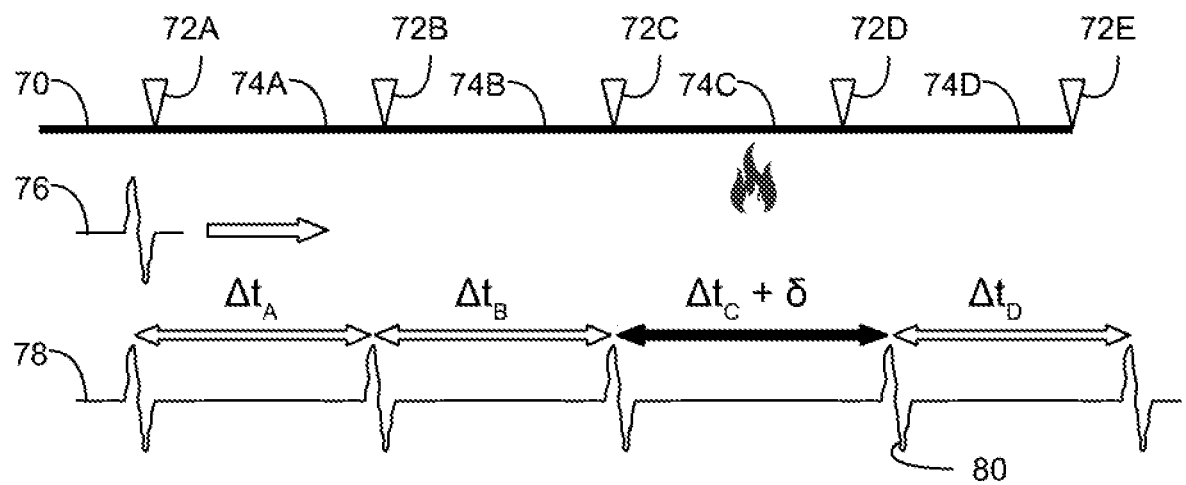
FIG. 4B illustrates the effect of heat applied to a sensing region of the active mechanical waveguide temperature sensor of FIG. 4A.

For the purposes of distributed temperature sensing, an ultrasonic thermography approach may be utilized. In particular, the change in elastic modulus and the thermal expansion of a material responsive to changes in temperature effect the propagation time of ultrasonic stress waves between points in the material, and can be used to infer temperature change from change in ultrasonic velocity. These effects are shown graphically in FIGS. 4A and 4B. As shown in FIG. 4A, for example, a distributed active mechanical waveguide 70 may include a plurality of reflection points 72A-72E (reflection point 72E represents the end of the waveguide), with a plurality of sensing regions 74A-74D defined between pairs of adjacent reflection points. An ultrasonic pulse 76 may be propagated along the waveguide 70, and a portion of the ultrasonic pulse is reflected from each reflection point 72A-72E, e.g., as illustrated by ultrasonic signal 78, which includes a series of reflection pulses 80 corresponding to each reflection point 72A-72E. The time of flight differences between adjacent reflection pulses are represented by $\Delta t_A$-$\Delta t_D$, and it will be appreciated that these time of flight differences are associated with the ultrasonic velocity of the ultrasonic pulse through the waveguide. The change in the difference in the arrival time of each pair of adjacent pulses is proportional to the change in temperature of the waveguide between the reflection points associated with those pulses, and thus by measuring the change in difference in arrival time, a temperature may be determined for the sensing region between the adjacent reflection points. This is illustrated graphically by FIG. 4B, whereby heat is applied to waveguide 70 in sensing region 74C defined between reflection points 72C and 72D, resulting in change in the difference in arrival time of the pulses associated with these reflection points equal to $\Delta t_C + \delta$, where $\delta$ is effectively proportional to temperature in the sensing region. It should be noted that this arrival time difference depends only on the temperature of the waveguide bounded by the two reflection points and is substantially insensitive to the temperature of any other portion of the waveguide. Any temperature change in any other sensing region of the waveguide will effectively shift both reflected pulses an equal amount and will not change the relative time between the two reflected pulses. As such, despite the heat applied to sensing region 74C, the time of flight differences for sensing regions 74A, 74B and 74D generally are unchanged.

Therefore, in some embodiments, temperature may be sensed by measuring time of flight differences between adjacent reflected pulses corresponding to the adjacent reflection points defining a sensing region. However, as will also be discussed below, in some instances the arrival time differences between reflected pulses may be small enough that pulse reflections overlap in the time domain, and an alternate frequency domain phase interference approach may be used to determine the differential time shift between pulses, as a frequency domain phase interference "pattern" occurs in the spectrum of overlapped pulses, and the shift in frequency of features in this phase pattern is generally proportional to the temperature change in the associated sensing region.

It will also be appreciated that the time between reflected pulses, when scaled by a calibration factor, effectively depends on the average temperature between the associated reflection points. As such, the time of flight differences between non-adjacent reflection points may also be used to measure an average temperature over multiple sensing regions. Thus, for example, the average temperature over the entire waveguide 70 may be determined via determining the time between the first reflection pulse and the last reflection pulse in the ultrasonic signal 78.

Furthermore, the discussion above notably does not take into account multi-bounce reflections. For example, when an incident pulse reflects off a downstream reflection point and travels back to the beginning of the waveguide, some of the reflected pulse will generally reflect off one or more upstream reflection points and travel back towards the end of the waveguide. As each reflection point only transmits part of the incident signal, some energy will generally be reflected multiple times. These additional reflections will generally be of smaller amplitude than the primary reflections; however, they are superfluous and may interfere with the desired primary reflections in some embodiments. As the additional reflections generally decrease in amplitude, only the larger reflections (lower order) are generally considered.

Also, it should be noted that as more reflection points are included in a waveguide, and each reflection point transmits only a portion of the ultrasonic energy, only a fraction of the initial ultrasonic energy will reach the end of the waveguide. Therefore, it will be appreciated that the amplitude of the initial ultrasonic pulse and the reflection coefficients of the reflection points may be tailored to ensure that the received ultrasonic signal is suitable for analysis. In some embodiments, for example, reflection coefficients may be configured to increase with waveguide length (e.g., so that the first few reflection points transmit more energy than they reflect) since less energy is generally required to be reflected for sufficient signal amplitude at the beginning of the waveguide. In an example embodiment, the reflection coefficient can be linearly increased along the waveguide up to about 0.5 for the last reflection point on the waveguide.

Furthermore, it is generally desirable in some embodiments to configure or space reflection points such that the reflections generated thereby are generally out of phase with one another, or otherwise configured such that secondary, tertiary, etc. reflections do not overlap with primary reflections.

It will also be appreciated that the foregoing techniques may be used for sensing other environmental conditions beyond temperature, e.g., strain, pressure, vibrations, acceleration, force, etc., so a distributed active mechanical environmental sensor may be used in some embodiments to measure other environmental conditions. Furthermore, different sensing regions may be configured to sense different environmental conditions such that multiple environmental conditions may be sensed with the same sensor or sensor network. Other variations will become more apparent below and will be apparent to those of ordinary skill having the benefit of the instant disclosure.

Active Mechanical Waveguide Sensor for Gas Turbine Engine Applications

Figure 5:
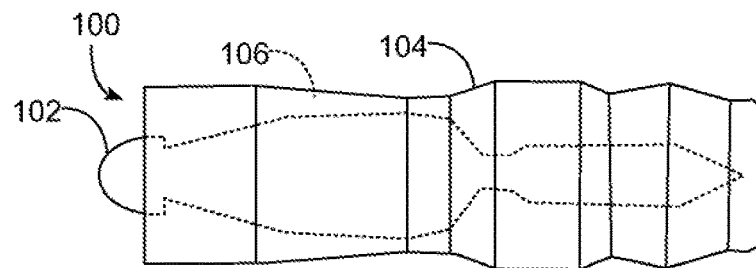
FIG. 5 is a functional side elevational view of an example gas turbine engine within which a distributed active mechanical waveguide sensor consistent with the invention may be used.

Among other applications, an active mechanical waveguide sensor may be used in gas turbine engine applications, e.g., within a chamber, port, or other suitable environment within a gas turbine engine and subjected to an environmental condition. FIG. 5, for example, illustrates an example gas turbine engine 100 including a housing 104, a rotor 102 and an environment 106 disposed therein.

Figure 6A:
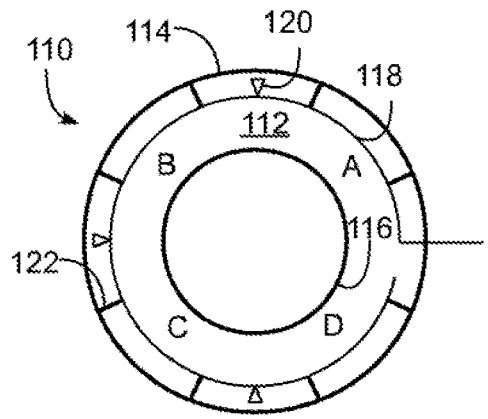
FIGS. 6A-6D are functional axial cross-sectional views taken through the example gas turbine engine of FIG. 5, and illustrating various example implementations of a distributed active mechanical waveguide sensor.

For example, in order to measure temperature at multiple locations within environment 106, a distributed active mechanical waveguide sensor may be used to provide multiple sensing regions for the multiple locations. FIG. 6A, for example, illustrates a cross-section of a gas turbine engine 110 having an environment or chamber 112 bounded by outer and inner walls 114, 116. A waveguide 118 (e.g., configured as a wire, curved rod or ring) may serve as a temperature sensing element and may circumscribe at least a portion of chamber 112, with reflection points 120 disposed approximately at 90 degree intervals to define (along with the end of the waveguide) four quadrants A-D for the purposes of sensing temperature or another environmental condition in chamber 112. Moreover, temperature over the entire length of the waveguide wire or between two non-adjacent reflection points may also be sensed. A piezoelectric transducer (not shown) may be mounted externally to the engine and coupled to the waveguide to both transmit and receive ultrasonic signals, or separate transducers may be disposed at each end of the waveguide, with either one configured for transmitting and the other for receiving, or with both configured for both functions to improve reliability and robustness.

Waveguide 118 may be mounted in chamber 112 in various manners, e.g., using a series of cantilevered support members 122 projecting inwardly from the outer wall 114 and generally transverse to the portion of the waveguide 118 supported thereby, and collectively supporting the waveguide in an arcuate or ring configuration. It will be appreciated that the end of the waveguide may be free and cantilevered from the last support member in some embodiments, whereas in other embodiments the end of the waveguide may be supported. Furthermore, in some embodiments reflection points may be formed at the support members, while in other embodiments, the waveguide may be supported such that no reflection points are defined at the points at which the waveguide is supported.

Figure 6B:
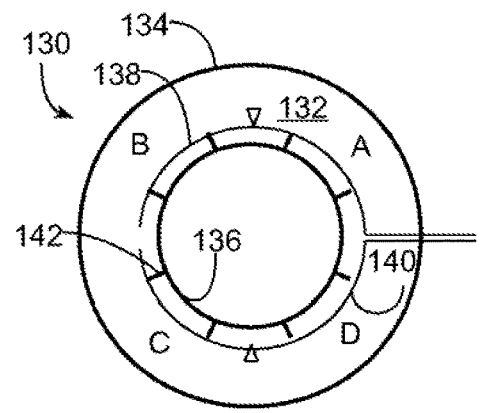

Alternatively, as illustrated in FIG. 6B, a waveguide may be mounted using support members coupled to an inner wall. Specifically, FIG. 6B illustrates a gas turbine engine 130 including a chamber 132 having outer and inner walls 134, 136, and with a waveguide 138 supported by a series of support members 142 extending outwardly from inner wall 136.

It will be appreciated that the inner and outer walls illustrated in FIGS. 6A and 6B are illustrated as circular in cross-section. In practice. however, the inner and outer walls can have different configurations and geometries, and moreover, a waveguide may be supported on different structures as may be appropriate for the application. In some embodiments, for example, support members may extend across multiple components (e.g., between the inner and outer walls) such that both ends of the support members are supported. Therefore, the use of support members cantilevered from inner or outer walls of a gas turbine engine chamber is not required.

In addition, while gas turbine engine 110 of FIG. 6A is illustrated with a single waveguide 118, gas turbine engine 130 of FIG. 6B includes two waveguides 138, 140, illustrating the fact that multiple waveguides may be used in some applications. Furthermore, waveguides 138, 140 may include reflection points to provide multiple sensing regions, such that the total number of sensing regions is the sum of the sensing regions used for the waveguides in a particular application.

Figure 6C:
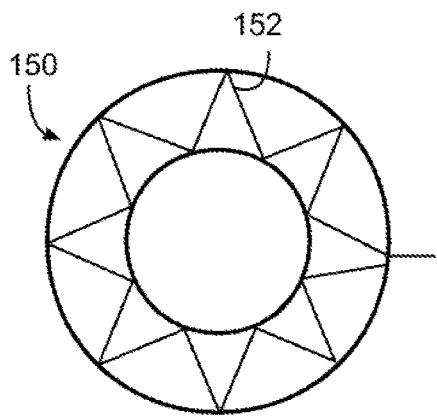
Figure 6D:
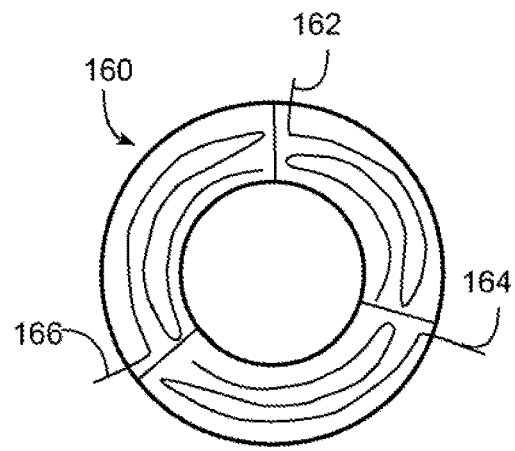

Furthermore. while a ring or arcuate waveguide configuration is illustrated in FIGS. 6A and 6B, one or more waveguides may be oriented differently in other applications to provide alternative sensing arrangements. FIG. 6C, for example, illustrates a gas turbine engine 150 where a waveguide 152 is oriented in a star configuration with portions extending between inner and outer walls of a chamber. Similarly, FIG. 6D illustrates a gas turbine engine 160 where three waveguides 162, 164, 166 are used for three different sensing zones and have multiple segments disposed at different radii from the cross-sectional center of the engine. Either configuration would enable environmental conditions to be measured at different radii and thereby provide sensing throughout a two dimensional region.

Figure 6E:
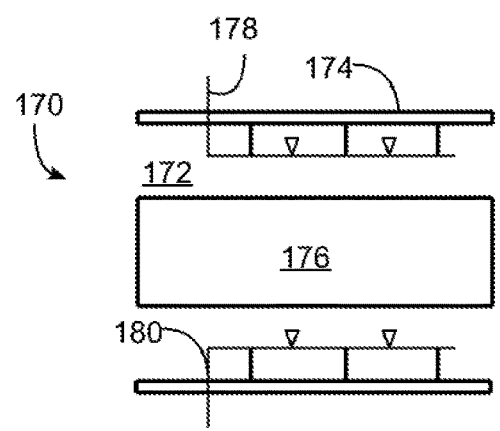
FIG. 6E is a functional lengthwise cross-sectional view of a portion of an example gas turbine engine and illustrating another example distributed active mechanical waveguide sensor consistent with some embodiments of the invention.

Furthermore, while FIGS. 6A-6D orient waveguides in plane that is transverse to a longitudinal axis of a gas turbine engine, the invention is not so limited. FIG. 6E, for example, illustrates a gas turbine engine 170 including a chamber 172 defined by outer and inner walls 174, 176, and including two waveguides 178, 180 that extend longitudinally along the chamber 172, and that include reflection points to provide sensing regions at different points along the longitudinal axis of the engine. e.g., to capture a temperature gradient in a direction generally parallel to a direction of fluid flow through the chamber. Moreover, in other embodiments these concepts may be combined such that sensing regions are dispersed throughout a three dimensional area in a chamber, e.g., to enable temperature gradients to be measured along multiple paths within a chamber.

Therefore, through the use of one or more waveguides, each with one or more sensing regions defined thereon, environmental conditions such as temperature may be sensed at multiple locations within an environment, e.g., a chamber of a gas turbine engine.

Active Waveguide Damping

Now turning to FIG. 7, it will be appreciated that in some applications, including, for example, gas turbine engine applications such as described above, a waveguide may be subject to other environmental conditions beyond that being sensed. For example, in a gas turbine engine, a waveguide may be subject to vibrations of the gas turbine engine, vibrations induced by rotation of a blade or other rotating structure within the gas turbine engine, and/or vibrations due to excitation (e.g., aerodynamic self-excitation) within the gas turbine engine, among other environmental effects. Therefore, it may be desirable in some applications to attempt to dampen or otherwise mitigate the effects of these environmental effects. Damping materials and/or configurations (hereinafter referred to collectively as "damping devices") may be selected in some embodiments to damp at lower mechanical frequencies consistent with environment vibrations while minimizing damping of ultrasonic frequencies.

FIG. 7, for example, illustrates at 200 a support structure for a portion of a waveguide 202, including a pair of support members 204A, 204B. In some embodiments, it may be desirable to utilize a damping device 206 between waveguide 202 and each support member 204A, 204B to dampen environment-induced vibrations of the waveguide. The damping device 206 may include a viscoelastic material, and may be configured as a bushing in some embodiments such that the waveguide extends through the bushing, although the invention is not so limited. Frictional damping may also be used for damping device 206 in some embodiments. Any material suitable for the environment and capable of damping vibrations or forces in the environment and reducing the amount of such effects on a waveguide may be used in other embodiments.

Also, in some embodiments, reduction in vibration may be provided by incorporating one or more masses 208 on the waveguide 202 in order to alter the frequency response of the portion of the waveguide 202 suspended between support members 204A, 204B. It will be appreciated that in environments such as gas turbine engines, vibrations and/or forces at different frequencies may be produced, and incorporation of such masses may alter the frequency response of a waveguide to minimize the amount of sympathetic vibrations in the waveguide for a given application.

Further, in some embodiments, one or more support members 204A, 204B may themselves incorporate damping, e.g., as illustrated at 209 on support member 204B, to further isolate waveguide 202 from environmental effects. Viscoelastic materials, frictional damping, and other configurations (e.g., shock absorber-like structures) may be used to minimize the communication of vibrations and other environmental effects from the environment to the support members, and thereafter the waveguide itself.

It will be appreciated that while FIG. 7 illustrates the use of bushings 206, masses 208 and support member damping 209 in the same application, any of these techniques may be used individually or in different combinations. Therefore, the invention is not limited to this particular combination of damping techniques.

In addition, as illustrated by FIGS. 8-12, damping may be applied directly to a waveguide in some embodiments. For example, FIG. 8 illustrates a cross section of a portion of an example waveguide 210 including a waveguide wire 212 (which may be flexible, e.g., as a filament, or rigid, e.g., as a rod, in different embodiments) circumscribed by a damping device 214, e.g., a braided steel over braid. In such configurations, it may also be desirable in some embodiments to incorporate an intermediate material 216 having low ultrasonic absorption (e.g., asbestos) to allow for relative movement between wire 212 and over braid 214.

Various damping devices may be used on a waveguide in other embodiments. Damping devices may include, for example, various viscoelastic or other vibration damping materials, sliding, fretting and rubbing, among others.

In other embodiments. and as illustrated in FIG. 9, a waveguide 220 may circumscribe a waveguide wire 222 with a substantially concentric tube 224 (e.g., a steel tube), and with a damping device 226 disposed within the space defined between the wire and the tube. The tube 224 may be formed of steel or another rigid material, and the damping device may be a viscoelastic material in some embodiments that completely fills the space between the wire and the tube.

In addition, as illustrated in FIG. 10, a waveguide 230 may include, instead of a wire, a tubular waveguide element 232, such that a concentric tube arrangement is formed between waveguide element 232 and a circumscribing tube 234, with a damping device 236 disposed within the space between these concentric tubes 232, 234.

As noted above, a damping device may completely fill the space between a tube and a waveguide wire or tube. In other embodiments, e.g., as illustrated by waveguide 240 in FIG. 11, a damping device may not completely fill this space, e.g., to reduce damping of desired ultrasonic energy propagated through the waveguide. Waveguide 240, in particular, is illustrated including a waveguide wire 242 circumscribed by a tube 244 and including spaced-apart O-rings or bushings 246 disposed along the length of the waveguide and supporting wire 242 within tube 244. As an alternative to bushings 246, voids may be formed between areas of damping devices (e.g., where damping devices are injected into the space, rather than being formed of distinct bushings or other elements).

In addition, as illustrated by ports 248, it may be desirable in some embodiments to provide ports along an outer tube of a waveguide, e.g., to expose the waveguide wire or tube to environmental conditions to be sensed, e.g., temperature, and thereby provide faster thermodynamic response. In some embodiments, a waveguide wire may be relatively thicker than in other applications (e.g., ⅛-¼ inch or more in diameter), whereby it may be desirable to incorporate ports to compensate for the greater relative mass of the waveguide wire.

In addition to and/or in lieu of viscoelastic damping material, frictional damping may be used in some embodiments. FIG. 12, for example, illustrates a waveguide 250 including a waveguide wire 252 circumscribed by a pair of concentric tubes 254, 256. Damping devices, e.g., viscoelastic O-rings or bushings 258, may support wire 252 within inner tube 256, while frictional damping, e.g., in the form of a corrugated spring member 260, may be disposed between tubes 254, 256. Other frictional damping configurations may be used in other embodiments, and it will be appreciated that other combinations of frictional damping and/or viscoelastic damping may be used in other embodiments.

Figure 13:
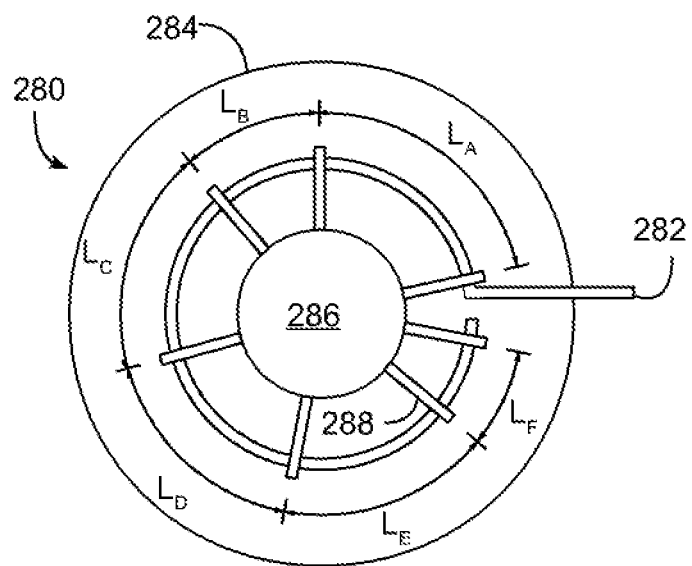
FIG. 13 is a functional axial cross-sectional view of another example gas turbine engine, and illustrating irregularly-spaced supports for a distributed active mechanical waveguide sensor.

Now turning to FIG. 13, an additional approach for damping environmental effects that may be used in some embodiments is to provide irregular support spacing for a waveguide. FIG. 13, in particular, illustrates a gas turbine engine 280 including an arcuate waveguide 282 supported between outer and inner walls 284, 286 of a generally cylindrical region or chamber and by a plurality of cantilevered support members 288. Notably, waveguide 282 is unsupported between support members 288, and the support members are spaced apart from one another to provide irregular spacing between adjacent support points for the waveguide (i.e., lengths $L_A$-$L_F$ differ from one another). Doing so spreads out the natural resonances in the waveguide (i.e., such that the resonances do not align with one another and/or with their harmonics) and thereby reduces environment-induced sympathetic resonant excitation of the waveguide.

Thermal Expansion Compensation

Figure 14:
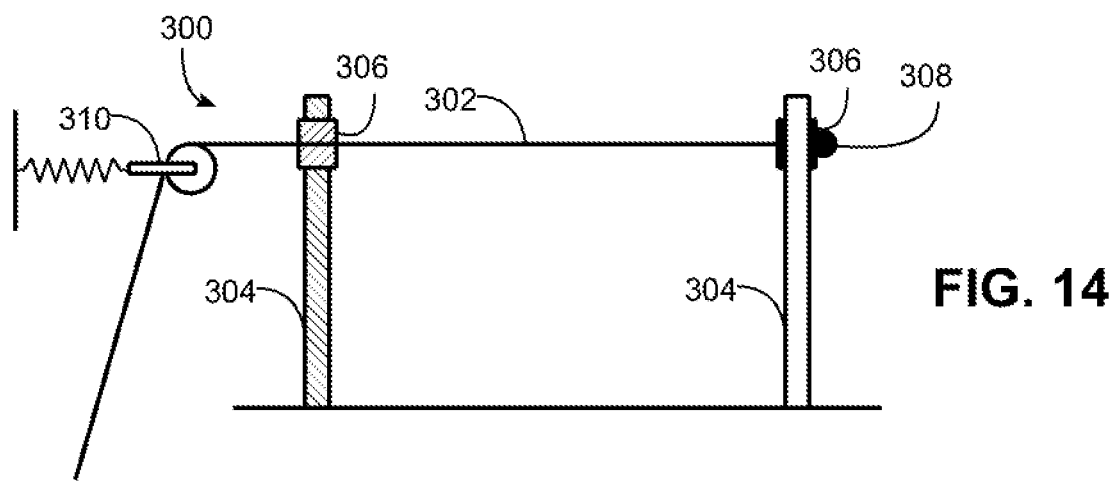
FIG. 14 is a functional view of another example mounting structure for a distributed active mechanical waveguide sensor consistent with some embodiments of the invention and including a tensioning device.

It may also be desirable in some embodiments to compensate for thermal expansion of a waveguide for some applications. For example, FIG. 14 illustrates an example waveguide 300 in which a waveguide wire 302 is supported between a pair of support members 304 but is otherwise unsupported between the support members. Damping devices, e.g., bushings 306, support wire 302 in each support member 304, but allow for linear movement or sliding of the waveguide wire within each bushing. Wire 302 is anchored at one end as illustrated at 308, and a tension device 310, e.g., including an anchored spring member and pulley (e.g., anchored to an inner or outer wall of a cylindrical chamber in a gas turbine engine), is used to maintain a substantially constant tension in the wire 302 over a range of temperatures in the environment and thereby compensate for thermal expansion of the waveguide. Tension device 310 is coupled to wire 302 intermediate the ends of the wire, and as the temperature in the environment changes, changes in wire tension (which might otherwise change the ultrasonic propagation characteristics of the wire) may be minimized.

It will be appreciated that various tensioning devices may be used in other embodiments, based, for example, on environmental resistance considerations. A tensioning device may also be disposed at different locations relative to a waveguide and/or anchored at different locations either within an environment or external to an environment (e.g., outside of a harsh environment, but nonetheless maintaining a substantially constant tension in the waveguide. Other variations will be apparent to those of ordinary skill having the benefit of the instant disclosure.

Damage Detection

In some embodiments, an active mechanical waveguide sensor may incorporate damage detection, as reflected ultrasonic pulses measured by a sensor may effectively provide a signature of the mechanical state of a waveguide along its entire length, in addition to the transduction electronics and transducers that generate an ultrasonic signal and record the reflections. A chip or notch on a waveguide, as well as plastic deformation (collectively referred to as deformations) can be detected, for example, by identifying the appearance of a reflection in a non-standard or unexpected location in an ultrasonic signal. A more severe fault such as a complete break in the waveguide will generally result in a drastic change in the end reflection and/or missing reflections. In addition. abrasions and other losses of material on a waveguide due to fretting or erosion may also detectable. In some embodiments, faults in various components, e.g., transducers, analog to digital (ADC) converters, digital to analog (DAC) converters, amplifiers, filters, control logic, and other electronic components may be detected. in addition, in some embodiments, faults external to a sensor may be detected, e.g., where some component is pushing on or otherwise contacting a waveguide.

Early identification of notching or chipping of an active mechanical waveguide may be useful for detecting ongoing degradation that may later lead to failure, even if a sensor is currently operating normally. Such defects will generally reflect ultrasonic energy, resulting in the appearance of detectable reflections in portions of a reflection time history where reflections are not expected, and may further be detectable based upon differences in amplitude relative to other, expected reflections. The amplitude and time of arrival of a "rogue" reflection, for example, may be used to determine one or both of a location and a severity of a fault. Similarly, plastic deformation of a waveguide can eventually lead to structural failure of the material, and can be detected in a similar manner to detection of notching. Further in either case, where a notch or deformation occurs relatively close to reflection points (e.g., between two reflection points), the resulting ultrasonic response may effectively "smear" the reflected pulses together.

Further, complete breaks of a waveguide may also be detected in some embodiments based upon the reflection signature, as the reflection signature will be missing reflections and/or the characteristics of the end reflection (e.g., amplitude) will generally differ from the baseline signature. Operation of a waveguide sensor in a caustic and/or erosive environment may also cause waveguide material loss, and may be detectable based upon variations from the expected baseline signature for the sensor.

The ability to accurately detect the location and extent of geometry or material characteristic changes to a waveguide enables not only damage and degradation detection, but enables intentionally created waveguide perturbations to be measured in some embodiments of the invention. For example, varying the distance from an ultrasonic transducer to each of multiple main reflection points on a waveguide may enable a serial numbering system to be implemented based on these distances. More complicated identification codes could be created utilizing, for instance, a series of small notches or diameter reductions in a waveguide at an appropriate location. Thus, in some embodiments, an identifier for a waveguide or sensor may be determined during operation based upon a received ultrasonic signal, e.g., based on times of arrival for one or more reflection pulses corresponding to identifier reflection points in the waveguide. The identifier reflection points may be dedicated to identification in some embodiments, or may be reflection points associated with different sensing regions. Furthermore, it will be appreciated that a serial number of identifier may be used to customize the operation of a sensor, e.g., to retrieve a baseline signature that has been associated with a particular serial number or other identification.

Furthermore, in some embodiments the location of a perturbation or other defect in a waveguide may be sensed depending upon the distance resolution of a sensor. In some embodiments, the position of a perturbation in a waveguide may be related to the frequency resolution of a data acquisition system used and the duration and frequency of an excitation pulse, and may enable precise location resolution to be achieved. For example, with a digitizer having a sampling rate of about 180 megasamples per second, the minimum measureable time difference is about 5.5 nanoseconds, and assuming a longitudinal velocity of approximately 5 mm/μs (for steel), the resolution of a reflection location would be about 27.5 μm. Further, in such embodiments, serial numbering could be implemented by positioning each portion of a serial number dictated by an individual reflection point by a difference of 0.05 mm in that reflection's distance from the transducer. Arbitrarily picking a maximum variation in the location of each reflection point to be 1 mm, and assuming an example waveguide including three reflection points, it would be possible to implement 8000 unique serial numbers by slightly varying the location of each of three reflection points.

Thus, in some embodiments, an active mechanical waveguide sensor may be capable of performing self-diagnosis with relatively simple data processing techniques that can detect and monitor several types of damage or defects. Monitoring the time domain reflection signature for changes can detect and characterize material loss, plastic deformation, notching, bending or a complete break. Erosion can also be detected by monitoring all reflections from the waveguide for time shifts that would indicate a change in ultrasonic velocity caused by a diameter change. Each of these types of damage can also be localized to a specific location on the waveguide, and self-identification could be supported by varying the distances of various reflection points along a waveguide.

Figure 15:
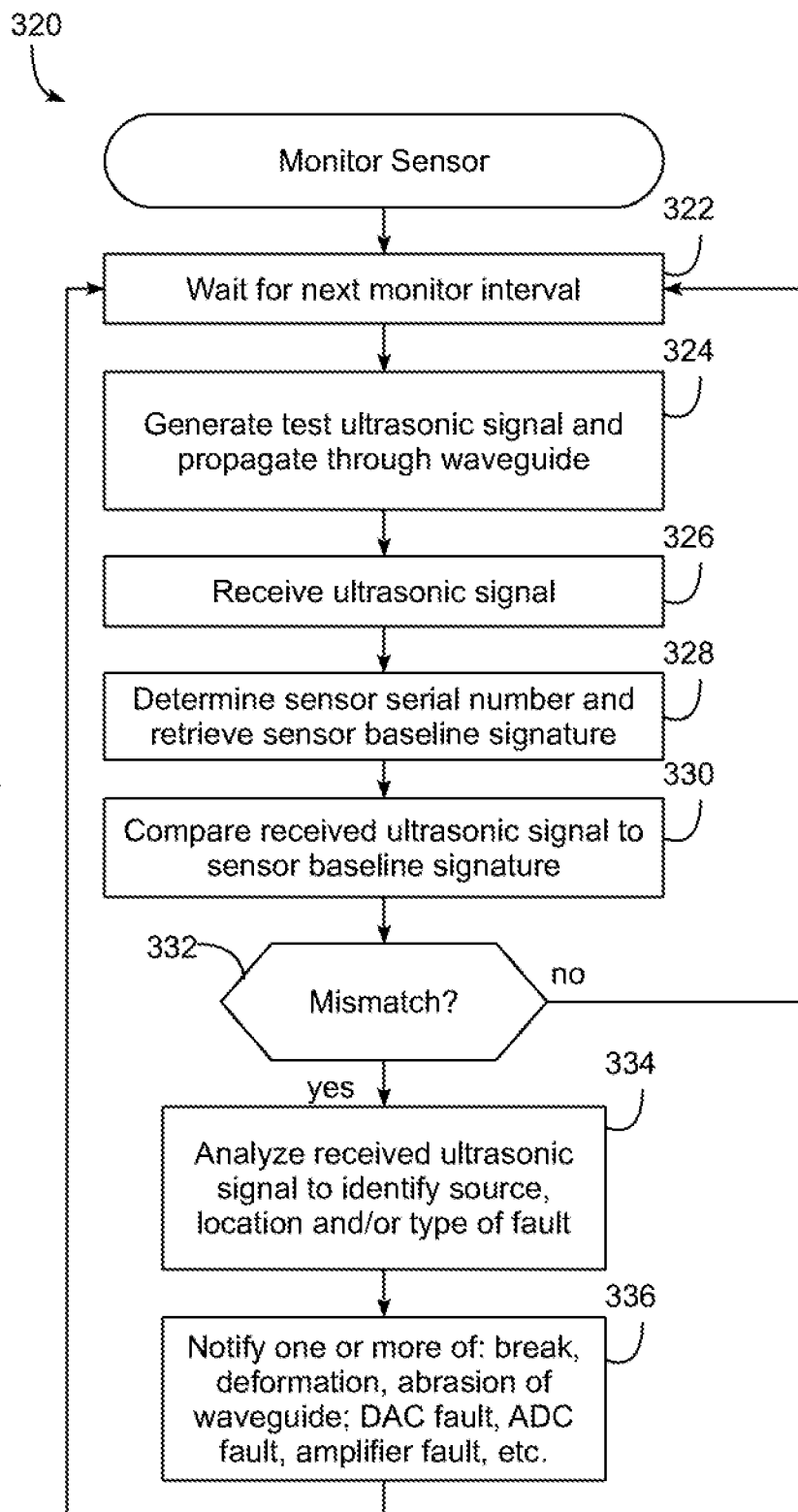
FIG. 15 is a flowchart illustrating an example sequence of operations for monitoring a sensor consistent with the invention.

FIG. 15, for example, illustrates an example monitor sensor routine 320 that may be implemented in connection with an active mechanical waveguide sensor in some embodiments, e.g., performed by control logic associated with such a sensor, or external thereto. Routine 320 may be configured to operate periodically or otherwise from time to time during the operation of the sensor, and thus block 322 waits for a next monitor interval. At that next monitor interval, control passes to block 324 to generate a test ultrasonic signal and propagate that signal through the waveguide. Block 326 then captures or receives a responsive ultrasonic signal from the waveguide, and block 328 optionally determines a sensor serial number or other identifier from the received ultrasonic signal (e.g., based on times of arrival of one or more expected reflection pulses that have been used to define the serial number for the waveguide) and retrieves a baseline signature for the sensor, representing the "expected" response to the test signal. In other embodiments, however, no identification may be sensed, and a baseline signature associated with the sensor, and generated, for example, in the manner discussed below in connection with FIG. 17, may be retrieved.

Block 330 next compares the received ultrasonic signal to the baseline signature for the sensor, and block 332 determines whether a mismatch exists, e.g., due to the presence of unexpected reflection pulses, lack of expected reflection pulses, amplitude differences, smearing of expected pulses, or other differences in the respective waveforms, which may be in the frequency and/or time domains.

If no mismatch has been detected, control passes to block 322 to wait for the next monitoring interval. Otherwise, control passes to block 334 to analyze the received ultrasonic signal to identify the source (e.g., the waveguide, DAC, ADC, or other electronics), location (e.g., position along waveguide and/or position relative to reflection points and/or other components of the sensor) and/or type (e.g., deformation, abrasion, break, electronics failure, etc.) of fault. Block 336 then generates a notification of the fault, e.g., one or more of a break, deformation, abrasion of the waveguide; a DAC fault, an ADS fault, an amplifier or other electronic component faults, etc., and control returns to block 322. Various notifications may be generated, e.g., interrupt signals, fault messages, fault logs, etc., and it will also be appreciated that the detection of a failure may result in various recovery operations.

While routine 320 is used for periodic monitoring, it will be appreciated that the routine may be used in other scenarios, e.g., during initialization of a sensor, prior to any sensing operation, on demand, etc.

Figure 16:
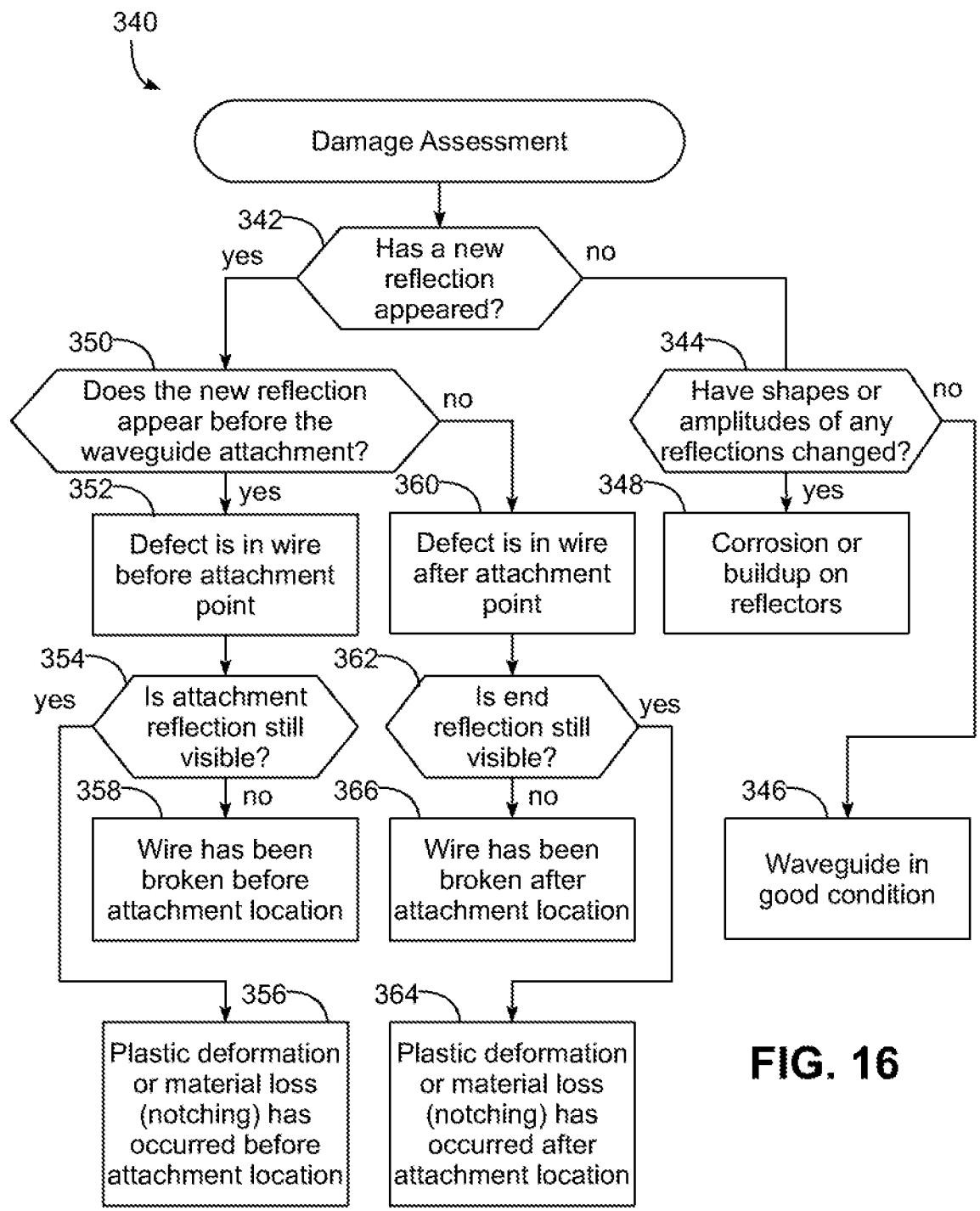
FIG. 16 is a flowchart illustrating an example damage assessment analysis capable of being applied in the sensor monitoring sequence of operations of FIG. 15.

Now turning to FIG. 16, this figure illustrates an example damage assessment analysis routine 340 that may be implemented, for example, in block 334 of FIG. 15. Other damage assessment approaches may be used in other embodiments, however, so routine 340 may not be used in other embodiments. Block 342 first determines whether a new or unexpected reflection has appeared in the received ultrasonic signal. If not, block 344 determines whether any of the reflections have changed shape or amplitude significantly. If not, the waveguide may be assumed to be in good condition, and control passes to block 346 to return this result.

Returning to block 344, if any reflections have changed shape or amplitude it may be assumed that there is corrosion, abrasion or buildup on the reflector or waveguide that has changed the reflected pulse, Accordingly, control passes to block 348 to return a fault associated with corrosion, abrasion or buildup on the waveguide.

Returning to block 342, if a new reflection has appeared in the ultrasonic signal, control passes to block 350 to determine whether the new reflection occurs before the waveguide attachment, i.e., before the first attachment point for the waveguide. It is assumed for the purposes of this example that the first attachment point is also the first reflection point, so in other embodiments where the first reflection point occurs before the first attachment point, or where the first attachment point does not also form a first reflection point, the first reflection point may be used in block 350.

If so. and as indicated in block 352. the defect is likely in the waveguide wire prior to the attachment point, and block 354 next determines if the attachment reflection is still visible in the received ultrasonic signal. If so, control passes to block 356 to return a fault indicating plastic deformation or material loss (notching) has occurred before the attachment location. If not, the reflection is missing, and control instead passes to block 358 to return a fault indicating that a complete break has occurred before the attachment location.

Returning to block 350, if the new reflection point occurs after the attachment point, this is indicated in block 362, and block 364 next determines if the end reflection (i.e., the last reflection corresponding to the end of the waveguide wire) is still visible in the received ultrasonic signal. If so, control passes to block 364 to return a fault indicating plastic deformation or material loss (notching) has occurred after the attachment location. If not, control instead passes to block 366 to return a fault indicating that a complete break has occurred after the attachment location.

It will also be appreciated that routine 340 can be extended to detect other faults, e.g., to detect breaks and/or plastic deformation between reflection points, e.g., by searching for reflections corresponding to expected reflection points and identifying when unexpected reflection points exist or expected reflection points are missing.

Figure 17:
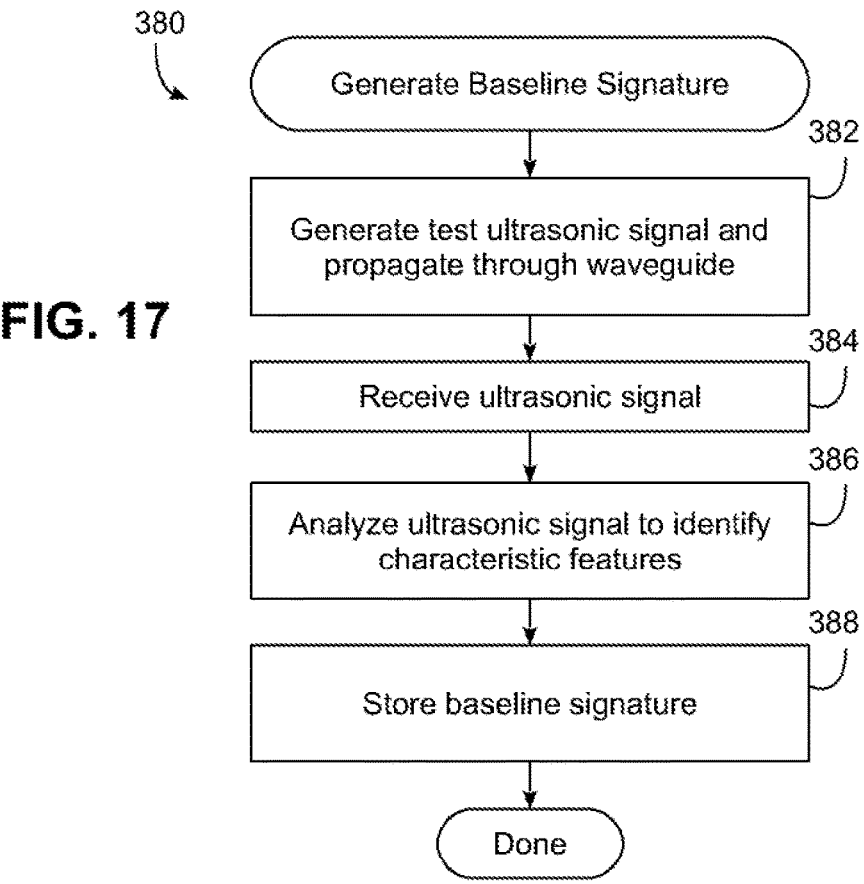
FIG. 17 is a flowchart illustrating an example sequence of operations for generating a sensor baseline signature consistent with the invention.

As noted above, monitoring may be based on a comparison with a baseline signature for a sensor. FIG. 17, for example, illustrates an example routine 380 suitable for generating a baseline signature for a sensor. Routine 380 may be performed, for example, in control logic for a sensor or by another computer or other electronic device, and may be performed at various times, e.g., during manufacture, testing, installation or initial setup of the sensor. In other embodiments, a baseline signature may be generated during operation of the sensor, and may be dynamically adjusted over time, e.g., by averaging signatures over time. In still other embodiments, a baseline signature may be developed analytically, e.g., during development of a sensor, and may not be based on empirical testing or signal capture of a sensor.

Routine 380 begins in block 382 by generating a test ultrasonic signal and propagating the test ultrasonic signal through the waveguide, e.g., one or more test pulses. Block 384 then captures or receives the ultrasonic signal generated in response to the test ultrasonic signal, which in some embodiments forms a pulse echo response for the waveguide, and block 386 analyzes the received ultrasonic signal to identify various characteristics or features of the signal, e.g., reflections, times of arrival of such reflections, amplitudes of reflections, and shapes of reflections, among others. Block 388 then stores this baseline signature for later retrieval and comparison during monitoring. It will be appreciated that a baseline signature may be represented in a wide variety of manners, e.g., identifying expected reflections and their associated amplitudes and/or times of arrival. In other embodiments, no analysis may occur and a received ultrasonic signal may simply be digitized and stored for use in a direct waveform comparison. Time domain and/or frequency domain information may be stored in some embodiments, and in some embodiments, the test ultrasonic signal may consist of pulses having various characteristics. Some embodiments, for example, may communicate relatively simple pulses such as square or sine pulses, while other embodiments may communicate more complex pulses have characteristics suitable for performing more detailed analysis of a pulse echo response generated in response to a test ultrasonic signal. Other variations will be apparent to those of ordinary skill having the benefit of the instant disclosure.

Figure 18:
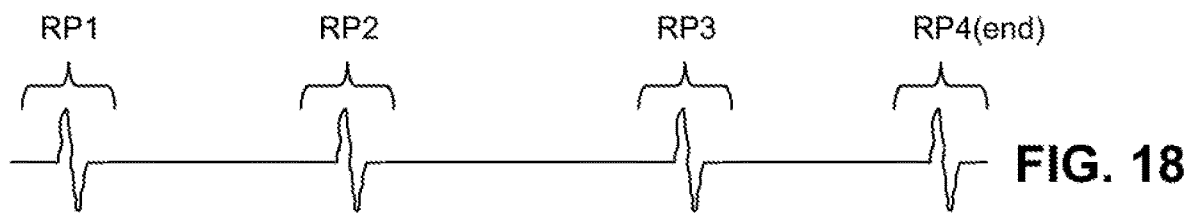
FIG. 18 illustrates an example sensor baseline signature captured for an illustrative active mechanical waveguide sensor.
Figure 19:
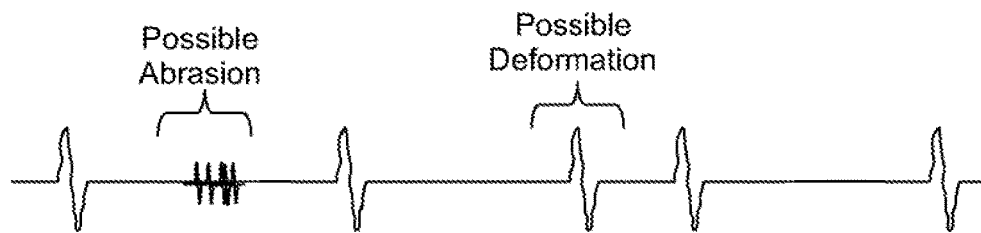
FIGS. 19 and 20 illustrate various fault-related deviations from the example sensor baseline signature of FIG. 18.
Figure 20:
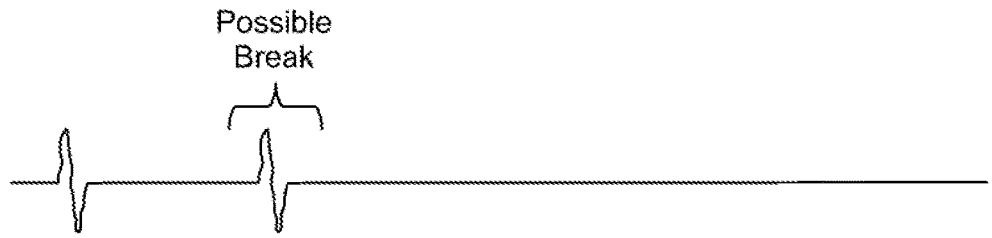

As a further illustration of damage detection consistent with the invention, FIG. 18 illustrates an example baseline signature for a sensor including a waveguide having three intermediate reflection points (RF1-RP3) along the length of the waveguide, along with a fourth reflection point (RP4) representing the end of the waveguide. FIG. 19 illustrates a scenario where the received ultrasonic signal during monitoring indicates a potential deformation of the waveguide between reflection points RP2 and RP3 due to the presence of an unexpected reflection pulse, along with a possible abrasion (or the start of some deformation) on the waveguide prior to reflection point RP2 due to the presence of a low amplitude noise or pulsing between the reflections corresponding to reflection points RP1 and RP2. FIG. 20 illustrates a scenario where a possible break has occurred after the first reflection point RP1, due to the presence of an unexpected reflection pulse prior to the expected RP2 reflection pulse, along with no further reflection points. It will be appreciated that in the occurrence of a break, a new "end" of the waveguide is effectively formed at the break, so some reflection pulse (which may be degraded relative to expected reflection pulses) will generally be returned whenever a break does occur.

Frequency Domain Feedback Drive System

In order to increase accuracy and minimize issues caused by spurious reflections a frequency feedback based measurement approach may be used in some embodiments in connection with a distributed active mechanical waveguide sensor. This approach capitalizes on the fact that multiple reflections created in a waveguide by a pair of reflection points produces standing waves, and the phase of the transmitted energy is a function of frequency and waveguide length. The wavelength ($\lambda$) for a signal in a material is generally given by: $\lambda=c/f$, where c is the material specific wave propagation velocity and f is the frequency. For a pair of reflection points, the maximum transmission will occur when these reflections are in phase, and this occurs at frequencies that are functions of the stress wave velocity, the distance between reflection points and the reflection coefficients of the reflection points. For reflection points consisting of a short section of waveguide with increased diameter these frequencies are $f_n=c/(4l)*(1+2n)$, $n=0, 1, 2 \ldots$. This means that if broadband ultrasound is driven into the waveguide, the dominant response will be this fundamental frequency and its harmonics. At these frequencies the guided wave bounces between reflection points many times and sensitivity to temperature and other environmental condition changes increases at this location in comparison to other places. If the response is low-pass or band-pass filtered for the fundamental frequency and then used as the driving signal, the system will drive this resonant frequency. If the region between a pair of reflections is heated, its resonant frequency will change, and the feedback-drive system will naturally follow it. This technique has several advantages: first, as long as each measurement point has a unique fundamental natural frequency, many temperature sensing regions can be tracked simultaneously without any need to separate the signals in the time domain, which is some instances reduces the complexity that would otherwise be needed for performing time-domain interpretation for a large number of sensing regions. Second, since only the resonant frequencies are driven, power requirements are generally low.

Figure 21:
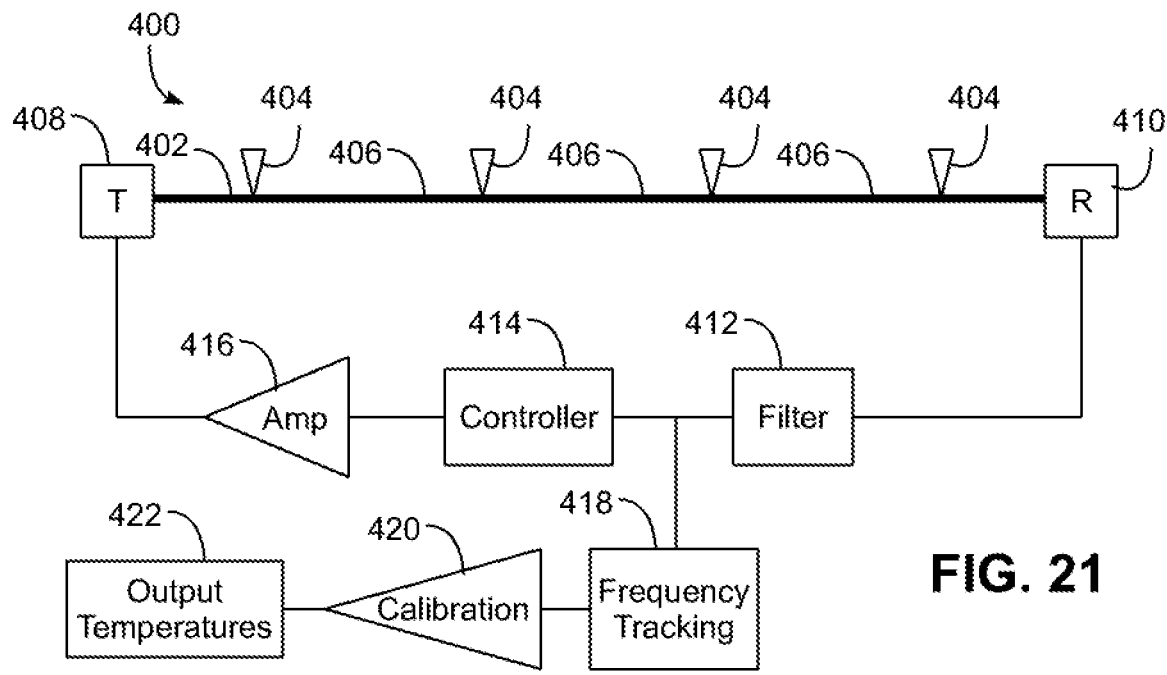
FIG. 21 is a functional block diagram of a distributed active mechanical waveguide sensor consistent with the invention and incorporating a positive feedback loop.

FIG. 21, for example, illustrates an example distributed active mechanical waveguide temperature sensor 400 including a waveguide wire 402 including multiple reflection points 404 that define a plurality of sensing regions 406. In this embodiment, separate transmit and receive transducers 408, 410 are coupled to opposite ends of the waveguide wire 402, and an analog filter 412 (e.g., a low pass or band pass filter), an amplitude/phase controller 414 (e.g., a proportional integral derivative (PID) controller) and amplifier 416 couple the output of the receive transducer 410 to the input of the transmit transducer 408 to form a positive feedback loop. Frequency tracking logic 418 tracks the resonant frequencies in the feedback loop, and a calibration is applied in block 420 to generate output temperatures proportional to the tracked resonant frequencies, which are then output by block 422.

Various manners of driving multiple resonant frequencies may be used in various embodiments. For example, broadband noise can be driven into a waveguide and the resonant frequencies measured by a transducer may be tracked open-loop, in addition, such an approach can also be used for initial self-calibration in order to locate the resonant frequencies to be tracked. Lock-in amplifiers, phase-locked loops, and adaptive gain control feedback drive systems, among others, are other approaches that may be used in some embodiments to control waveguide excitation and feedback at multiple resonant frequencies.

In some embodiments, undesired environmental effects may also be tracked and compensated in such a frequency tracking approach. For example, a second (higher-frequency) mode may be intentionally driven off-resonance (e.g., proximate a point of maximum slope in amplitude) and at a fixed amplitude for comparison against a primary mode for normalization purposes (e.g., to remove effects of transducer amplitude changes). These amplitude changes may then be used to drive another control loop, where the notional time delay for group delay compensation for a primary mode is the control variable. such that in response to amplitude changes the time delay may be adjusted until a desired notional amplitude is achieved. In other embodiments, several tones may be driven near a resonance frequency to detect drift off the resonance and correct the time delay, or to better fit the "true" resonance frequency, and ignore the fact that a drift off of the peak has occurred.

Figure 22:
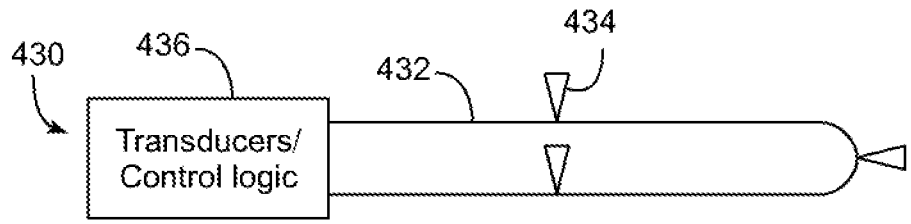
FIG. 22 is a functional block diagram of another distributed active mechanical waveguide sensor consistent with the invention and incorporating separate transducers disposed in the same housing.

In addition, in some embodiments, while the transmit and receive transducers may be disposed at opposite ends of a waveguide wire, both transducers can be packaged together by routing the waveguide as a loop, as shown in FIG. 22, where a sensor 430 includes a looped waveguide wire 432 including reflection points 434 and with both ends coupled to transducers/control logic 436 in the same package. Such an embodiment has several advantages: no extra wiring need be run for the receive transducer and if the waveguide were to be damaged somewhere along its length, the system could switch to a time-domain model with one of the transducers repurposed to operate as both transmitter and receiver.

It will be appreciated that each sensing region of a distributed active mechanical waveguide sensor may be tuned to have a different baseline resonant frequency (e.g., a resonant frequency at room temperature) from the other sensing regions. Reflection/transmission coefficients. lengths of sensing regions (i.e., distances between adjacent reflection points), damping and/or waveguide material or geometry-related properties that affect velocity may be varied to tune different sensing regions. It may be desirable, for example, to configure each sensing region such that the baseline resonant frequency of each sensing region is non-harmonic relative to the other sensing regions. Moreover, in some embodiments different environmental conditions may be sensed within the same sensing region and different resonant frequencies may be associated with each environmental condition.

It has been found, for example. that in an example titanium waveguide resonant frequency temperature sensor, the frequency shift per degree Fahrenheit is about 150 Hz, which provides approximately 100 kHz of frequency shift for a 700° F. measurement range. To have twenty independent sensing regions on one waveguide would therefore require about 2 MHz of usable bandwidth. In another example distributed active mechanical waveguide temperature sensor, the waveguide wire was approximately three meters long with two sensing regions and constructed from 0.022" steel wire. Two different temperature measurements regions were placed along the waveguide, with the first sensing region made by creating two reflection points spaced about 6 mm apart, which resulted in a resonant frequency of fn=567 kHz, and with the second sensing region made by creating two reflection points spaced about 9 mm apart, which resulted in a resonant frequency of fn=435 kHz. Heat applied to either sensing region altered the resonant frequency of that sensing region, and the resonant frequency of the other sensing region remained substantially stable.

As noted above, different sensing regions may be configured to sense different environmental conditions, e.g., where a first sensing region senses temperature and a second sensing region senses pressure. In some embodiments, however, multiple environmental conditions may be sensed within the same sensing region, e.g., by tuning the response of the sensing region to provide one resonant frequency response for one environmental condition and another resonant frequency response for another environmental condition.

Phase Change Tracking

In some embodiments, phase change tracking may be used to sense temperature and other environmental effects in one or more sensing regions of an active mechanical waveguide. Phase change tracking therefore may be used, for example, in connection with distributed active mechanical waveguide sensors including multiple sensing regions, as well as in connection with active mechanical waveguide sensors including only a single sensing region.

Phase change tracking may include in part tracking a phase derivative of an ultrasonic signal propagated through a waveguide in response to active excitation of the waveguide with ultrasonic energy, e.g., ultrasonic stress waves. In some embodiments, for example, a phase inflection point frequency may be determined from a tracked phase derivative, and a value for an environmental condition such as temperature may be determined based upon the determined phase inflection point frequency.

Figure 23:
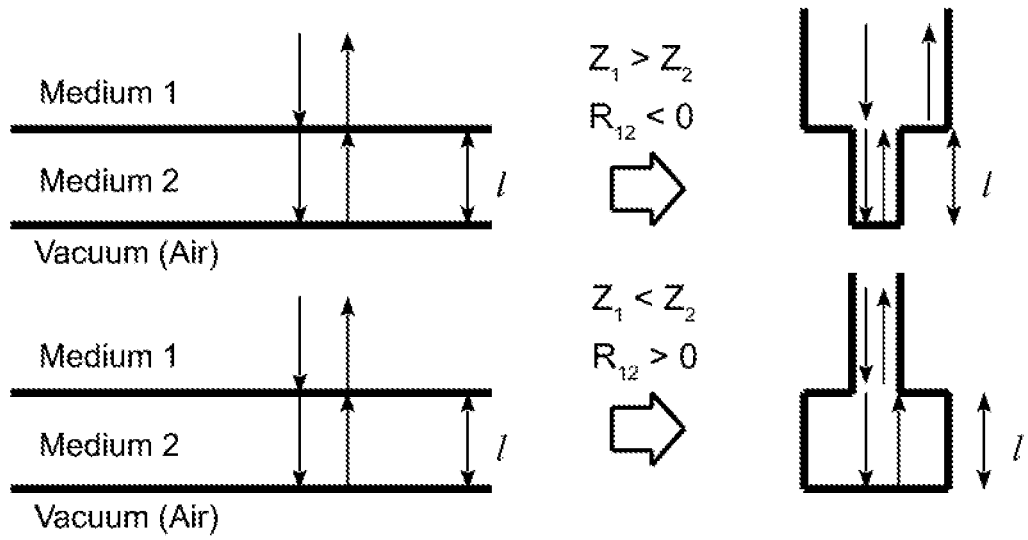
FIG. 23 illustrates reflection propagation in step up and step down discontinuities in a waveguide.

For the purposes of explanation, assume that a reflection point in a waveguide is implemented as a step on a cylindrical waveguide, as is illustrated on the right of FIG. 23 with both a step down (wide to narrow, top right) and a step up (narrow to wide, bottom right). Generally, the reflection of an ultrasonic wave on a step in cylindrical waveguide cannot be described exactly analytically, e.g., as compared to layers that are infinite in a lateral direction, as represented on the left of FIG. 23, which illustrates two media layers (medium 1 and medium 2), along with an air-backed layer bounding medium 2. For the purposes of this illustration, $Z_1$ and $Z_2$ are the impedances of medium 1 and medium 2, respectively, and $R_{12}$ is the reflection coefficient for the step corresponding to the boundary between medium 1 and medium 2, and it will be appreciated that a step down (top right of FIG. 23) corresponds to a negative reflection coefficient $R_{12}$ and the impedance of medium 1 being greater than that of medium 2, while a step up (bottom right of FIG. 23) corresponds to a positive reflection coefficient $R_{12}$ and the impedance of medium 1 being less than that of medium 2.

Assume first a layer bounded between two unbounded media (e.g., where medium 2 was bounded by a medium 3 rather than an air-backed layer). From the perspective of wave propagation, Incident, reflected (in medium 1) and transmitted (in medium 3) waves would present a wave pattern presenting a standing wave as a result of reflections between layer boundaries.

The normal incidence reflection coefficient R for such a system can be presented as equation (1):

$$R = \frac{R_{12} + R_{23}\exp(2i\varphi)}{1 + R_{12}R_{23}\exp(2i\varphi)} \quad (1)$$

where $R_{12}=(Z_2-Z_1)/(Z_2+Z_1)$ and $R_{23}=(Z_3-Z_2)/(Z_3+Z_2)$ are the reflection coefficients on the boundaries 1-2 and 2-3. The acoustic impedances $Z_i=\rho_i v_i$ present the products of medium densities $\rho_i$ to their longitudinal ultrasonic velocities $v_i$. The propagating phase inside layer is $\varphi=kl$, where $l$ is the layer thickness and $k=2\pi/\lambda=2\pi f/v_2$ is the longitudinal wavenumber in the layer (f is ultrasonic frequency and $\lambda$ is the wavelength inside layer). Depending on frequency (or propagating phase) the reflection coefficient (1) varies with frequency and the behavior allows ones to connect it with the layer parameters (its thickness l and the ultrasonic velocity $v_2$ inside layer). The amplitude of the reflection coefficient $|R|$ and its phase P can be written separately as:

$$|R| = \sqrt{\frac{R_{12}^2 + 2R_{12}R_{23}\cos2\varphi + R_{23}^2}{1 + 2R_{12}R_{23}\cos2\varphi + R_{12}^2 R_{23}^2}} \qquad (2)$$

and $$P = \text{acrtan}\left(\frac{R_{23}(1-R_{12}^2)\sin2\varphi}{R_{12}(1+R_{23}^2) + R_{23}(1+R_{12}^2)\cos2\varphi}\right) \qquad (3)$$

The amplitude and phase are function of relative properties of the three media, and if it is assumed that the third layer is replaced with air (or a vacuum), it can be assumed that no ultrasonic wave can propagate below it, and the structure of the resonances inside the layer will change. The acoustic impedance of air $Z_3 \approx 0$ and the reflection coefficient on the boundary 2-3 is equal to $R_{23}=-1$. Substituting these values into equation (1) for reflection coefficient results in:

$$R = \frac{R_{12} - \exp(2i\varphi)}{1 - R_{12}\exp(2i\varphi)} \qquad (4)$$

and $$|R| = 1 \qquad (5)$$

and $$P = \text{atan}\left(\frac{-(1-R_{12}^2)\sin2\varphi}{2R_{12} - (1+R_{12}^2)\cos2\varphi}\right) \qquad (6)$$

Figure 24:
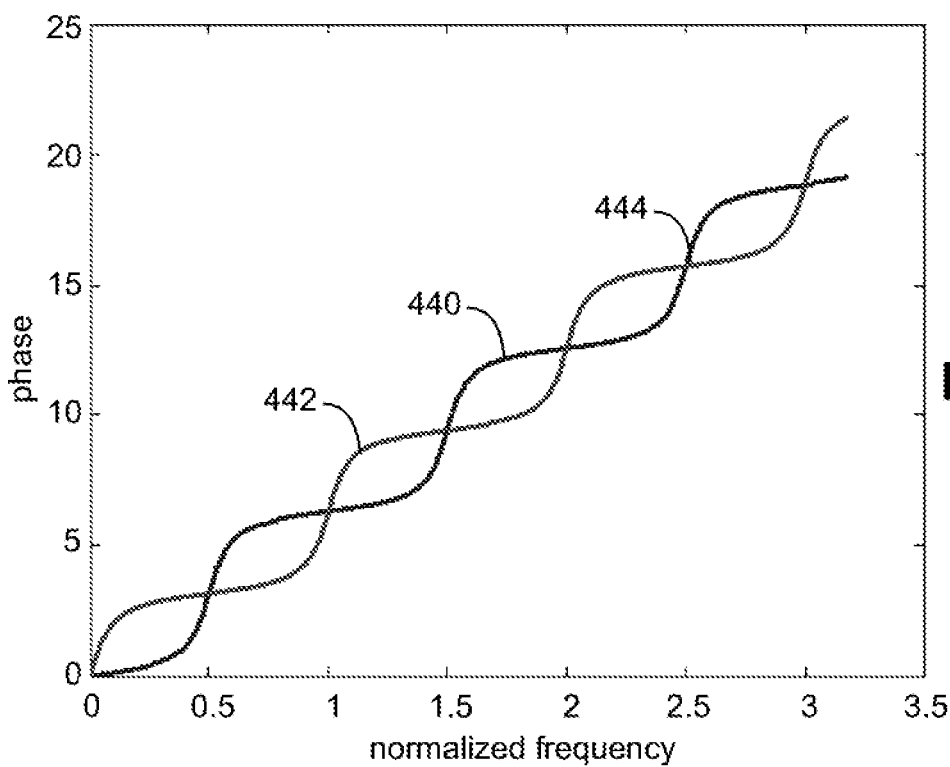
FIG. 24 illustrates phases of reflected signals from a medium-layer-air system versus a normalized propagating phase inside layer.

The magnitude of the reflection coefficient is equal to one, and it is clear from an energy conservation point of view because the energy returns back to medium 1 (without attenuation). The properties of the layer or its changes generally cannot be measured in the same manner as for the symmetrical case (minima of the reflection coefficient) because of $|R|=1$. So, in order to obtain the layer properties and their changes the phase of reflection coefficient features may be used. The phase of the wave reflected from the air-backed layer is presented in FIG. 24 for two different situations. Curve 440 presents the hard-soft-air case when the medium 1 acoustic impedance is larger than the medium 2 layer, $Z_1>Z_2$, $Z_1/Z_2=5$, $R_{12}=-0.67<0$, and curve 442 presents the opposite soft-hard-air case when the medium 1 acoustic impedance is lower than the medium 2 layer, $Z_1<Z_2$, $Z_2/Z_1=5$, $R_{12}=+0.67>0$. It should be noted that both curves have no discontinuity points where the phase jumps. At the same time the curves change their curvatures from concave to convex in inflection points (e.g., inflection point 444), which means that at those points the second derivative $$\frac{d^2 P}{d\varphi^2} = 0$$

or the first derivatives have maxima or minima. Taking the derivatives of equation (6) results in:

$$\frac{dP}{d\varphi} = \frac{2(1-R_{12}^2)}{1+R_{12}^2 - 2R_{12}\cos2\varphi} = \frac{2(1-R_{12}^2)}{(1-R_{12})^2\cos^2\varphi + (1+R_{12})^2\sin^2\varphi} \qquad (7)$$

and $$\frac{d^2 P}{d\varphi^2} = \frac{-8R_{12}(1-R_{12}^2)\sin2\varphi}{(1+R_{12}^2 - 2R_{12}\cos2\varphi)^2} \qquad (8)$$

Figure 25:
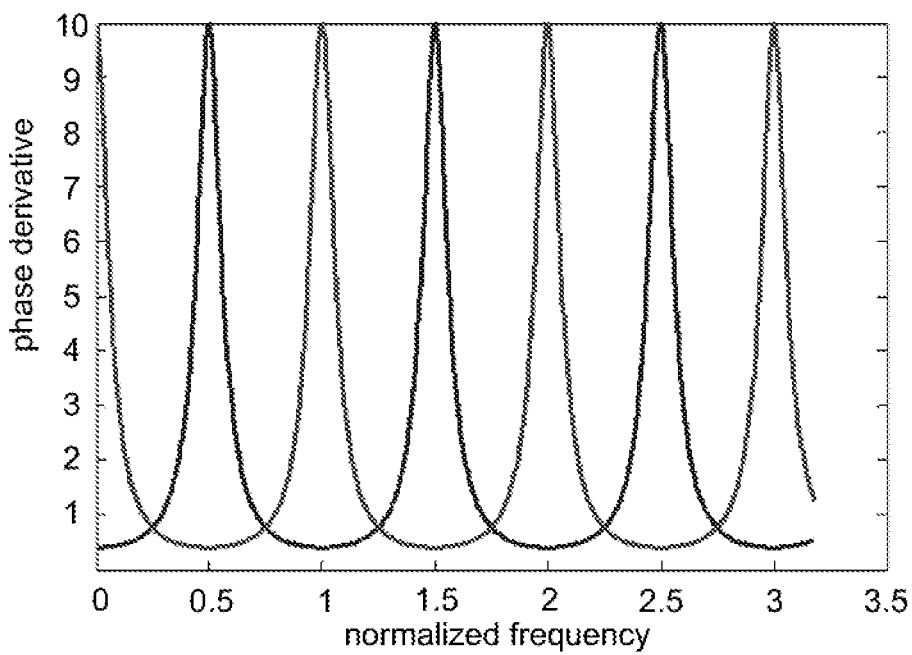
FIG. 25 illustrates phase derivatives of the reflected signals represented in FIG. 24.

The phase inflection points (or max and min of its derivative) are determined by $\sin 2\varphi=0$ or $\varphi/\pi=n/2$ for both cases $Z_1 \lessgtr Z_2$. Structure of the maxima and minima of $dP/d\varphi$ is different. If the maximum peaks are sharp then the minima ones are flat. Changing of the layer properties (for example, due to temperature) causes shifts in the frequency of the peaks. It is clear that sharper peaks assist with detecting changes due to the difficulty in determining exact peak position if a peak is relatively flat, particularly small changes of peak position due to temperature. The phase derivative graphs for the two aforementioned cases are presented in FIG. 25 for the same parameters $Z_1, Z_2$ and $R_{12}$, and it can be seen that useful phase peak positions are:

$$\frac{\varphi}{\pi} = \frac{1}{2} + n, n = 0, 1, \ldots \text{ ; for } Z_1 > Z_2, R_{12} < 0; \qquad (9)$$

and $$\frac{\varphi}{\pi} = 1 + n, n = 0, 1, \ldots \text{ ; for } Z_1 < Z_2, R_{12} > 0; \qquad (10)$$

In the frequency domain this corresponds to:

$$f_n = \frac{v}{2l}\left(\frac{1}{2} + n\right), n = 0, 1, \ldots, \text{ for } Z_1 > Z_2, R_{12} < 0; \qquad (11)$$

and $$f_n = \frac{v}{2l}(1+n), n = 0, 1, \ldots \text{ ; for } Z_1 < Z_2, R_{12} > 0; \qquad (12)$$

Another parameter is the variation with frequency of the amplitude of $P/d\varphi$, and the higher this amplitude and the sharper the appropriate peaks, the more accurately the position of these peaks can be determined. Substituting maximum and minimum of $dP/d\varphi$ from equation (7) results in:

$$\Delta\left(\frac{dP}{d\varphi}\right) = \left(\frac{dP}{d\varphi}\right)_{max} - \left(\frac{dP}{d\varphi}\right)_{min} = \frac{8|R_{12}|}{1-R_{12}^2} = 2\left|\frac{Z_2}{Z_1} - \frac{Z_1}{Z_2}\right| \qquad (13)$$

As such, the larger reflection coefficient causes higher amplitude variations and sharper peaks in the phase derivative. A larger reflection coefficient means a larger impedance ratio between $Z_2$ and $Z_1$, and equation (13) is symmetrical with respect to the ratio.

Some observations for the air-backed layer are as follows. The phase P of the reflection coefficient has no discontinuity. Further, there are inflection points on the phase dependence (where $$\frac{d^2P}{d\varphi^2} = 0$$

or minima and maxima of the phase derivative $dP/d\varphi$) that depend on layer thickness and velocity in each layer. These points can be used for temperature measurements because both the layer thicknesses and velocities in the layers are functions of temperature. Moreover, the higher the difference between medium and layer acoustic impedances, the sharper the peaks are for phase derivative dependence.

Now returning to FIG. 23, reflection of an ultrasonic wave from a step in a cylindrical waveguide generally cannot be described exactly analytically, as it has been done for the aforementioned layer configurations that are infinite in the lateral direction. On the other hand, there is some correspondence between these two cases. The reflection coefficient of the step ($R_{12}$), for example, can be introduced in the same form as for the medium 1 layer above:

$$R \approx \frac{R_{12} - \exp(2i\varphi)}{1 - R_{12}\exp(2i\varphi)}; |R| = 1 \qquad (14)$$

where $R_{12}$ is the reflection coefficient of the step (at the position of the cross-section change) and $\varphi = kl$ is the propagating phase in the shoulder of length l. The "diameter step" reflection coefficient $R_{12}$ can be estimated approximately. For example, in a 1D model of discontinuity it can be presented as follows:

$$R_{12} \approx \frac{S_2 - S_1}{S_2 + S_1} = \frac{r_2^2 - r_1^2}{r_2^2 + r_1^2} \qquad (15)$$

where $S_1$ is the initial waveguide cross-section area and $S_2$ is the shoulder cross-section area and $r_{1,2}$ are correspondent radii. For a wide-to-narrow (thick-to-thin) step ($S_1 > S_2$) the reflection coefficient $R_{12} < 0$, and for a narrow-to-wide (thin-to-thick) step ($S_1 < S_2$) it is $R_{12} > 0$. So the thick-to-thin step corresponds to air-backed layer with $Z_1 < Z_2$ and the thin-to-thick step corresponds to the case $Z_1 > Z_2$. The magnitude of the reflection coefficient may also be considered to be equal to one, as from an energy conservation point of view the imparted energy ultimately returns back (without attenuation).

The phase P of the reflection coefficient is:

$$P = \operatorname{atan}\left(\frac{-(1 - R_{12}^2)\sin 2\varphi}{2R_{12} - (1 + R_{12}^2)\cos 2\varphi}\right) \qquad (16)$$

Figure 26:
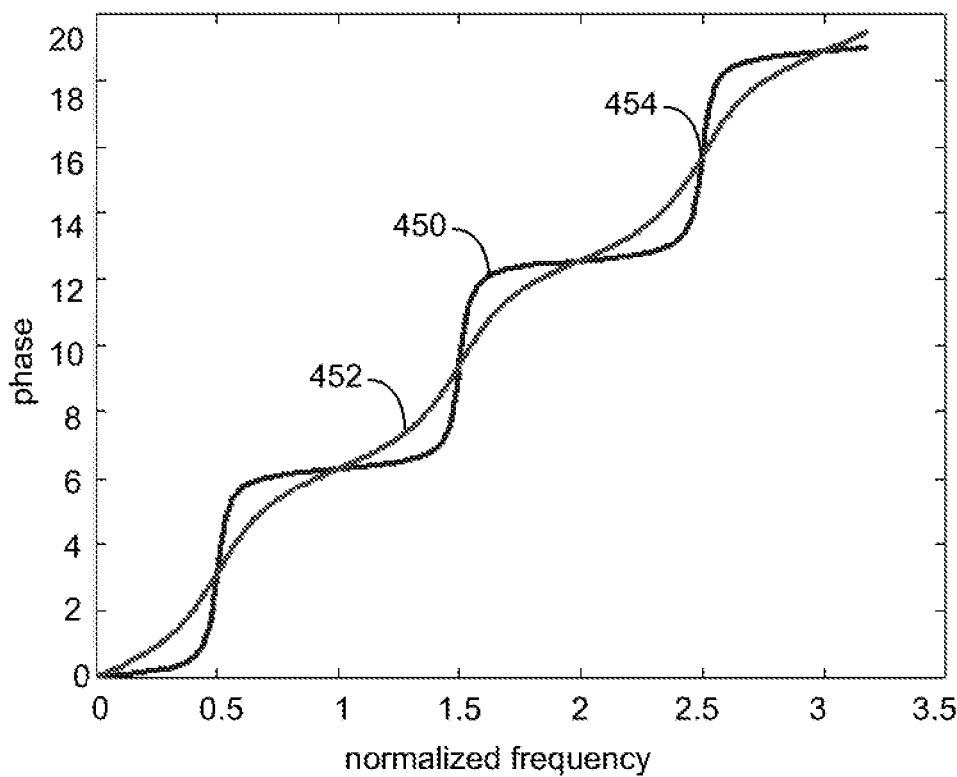
FIG. 26 illustrates phases of reflected signals from step up and step down waveguide discontinuities versus a normalized propagating phase inside layer.
Figure 27:
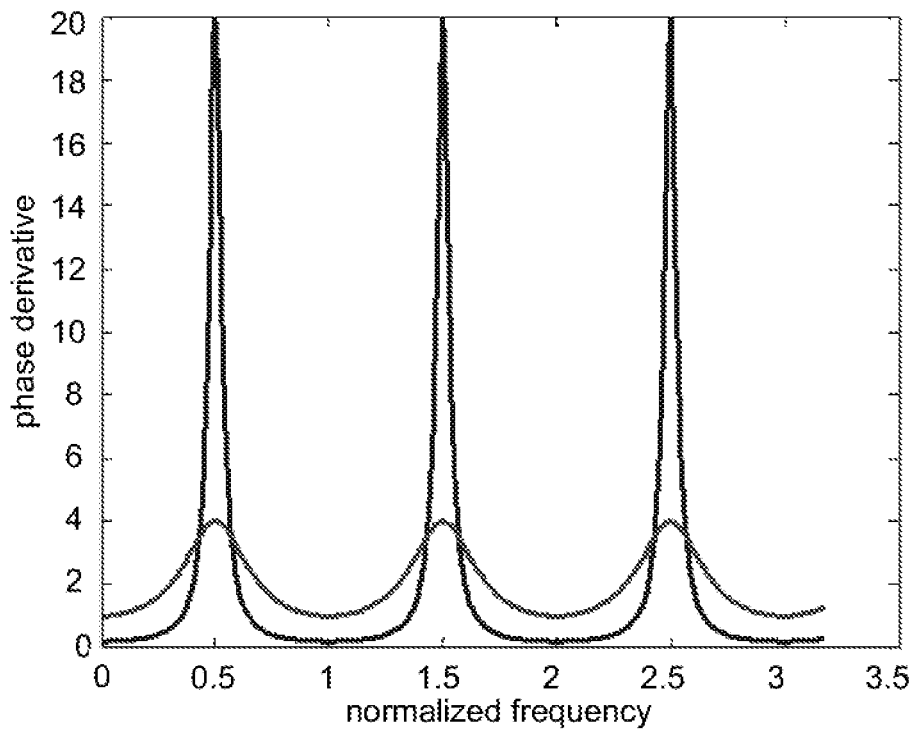
FIG. 27 illustrates phase derivatives of the reflected signals represented in FIG. 26.

As a further illustration, FIG. 26 illustrates the phases of waves reflected from a step for the thick-thin case, or $Z_1 > Z_2$. Curve 450 represents a larger acoustic impedance ratio $Z_2/Z_1 = 0.1$, $R_{12} = -0.82$ and curve 452 represents a smaller acoustic impedance ratio $Z_2/Z_1 = 0.5$, $R_{12} = -0.33$. The correspondent phase derivatives $dP/d\varphi$ for these parameters are presented in FIG. 27. It should be noted that both curves have no discontinuity points where the phase jumps, and at the same time the curves change their curvatures from concave to convex in inflection points (e.g., inflection point 454), whereby at such points the second derivative $$\frac{d^2P}{d\varphi^2} = 0$$

or the first derivatives have maxima or minima.

The phase derivative peak positions are:

$$\frac{\varphi}{\pi} = \frac{1}{2} + n, n = 0, 1, \ldots \; ; \text{for } Z_1 < Z_2, R_{12} < 0; \qquad (17)$$

and in the frequency domain this corresponds to:

$$f_n = \frac{v}{2l}\left(\frac{1}{2} + n\right), n = 0, 1, \ldots, \text{for } Z_1 > Z_2, R_{12} < 0; \qquad (18)$$

Because both the ultrasonic velocity v and the step length l are functions of temperature the resonance frequencies $f_n$ depend on temperature as well, and can thereby be used for temperature measurements. An advantage of such an approach is that it allows to make the step length, as well as the distance between adjacent reflection points, much shorter in comparison with a time domain-based approach where pulse reflections may overlap one another if spaced too closely.

Thus, in some embodiments, environmental condition measurements may be based on the phase of a reflected ultrasonic signal in an active mechanical waveguide. In particular, the phase inflection point frequencies (minima or maxima of the phase derivative) are sensitive to environmental conditions such as temperature and can be used for measurement of such conditions.

Furthermore, while the above analysis applies to steps, it will be appreciated that the analysis applies more generally to any reflection points formed along the length of a waveguide. For example, in the case of diameter discontinuities in the middle of a waveguide (e.g., a bump comprising a step up followed by a step down or a channel comprising a step down followed by a step up), the geometry is similar to the case of a layer between two identical media. For a symmetrical bump, $R_{12} > 0$, $R_{23} < 0$, $R_{12} = -R_{23}$ and for a channel discontinuity $R_{12} < 0$, $R_{23} > 0$, $R_{12} = -R_{23}$, so for both geometries the reflection coefficient is equal to:

$$R \approx \frac{R_{12}(1 - \exp(2i\varphi))}{1 - R_{12}^2\exp(2i\varphi)} \qquad (19)$$

with different sign of $R_{12}$ for the bump and the channel geometries.

Frequency-Dependent Reflectors

It may also be desirable in some embodiments to incorporate frequency-dependent reflectors into an active mechanical waveguide to enable the reflection characteristics of such reflectors to be varied based upon one or more drive frequencies of a signal used to drive an ultrasonic transducer that propagates ultrasonic stress waves through the waveguide. In some instances, for example, a drive frequency may be selected to render a reflector substantially transparent in some situations such that the reflector does not generate reflections (or in the least, generates reflections of minimal amplitude) in response to an ultrasonic input to the waveguide.

Figure 28:
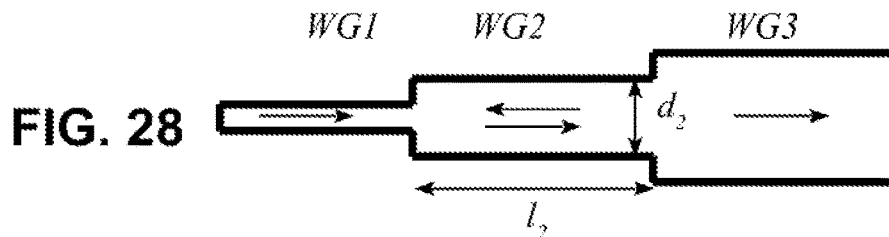
FIG. 28 illustrates reflection propagation in a three waveguide connection.

For the purposes of explanation, consider the general example of three waveguide portions, WG1-WG3, illustrated in FIG. 28, where an incident wave propagates in infinite WG1, then reflects and transmits in finite WG2 (having a geometry defined by a length $l_2$ and diameter $d_2$), and exits the connection through infinite WG3. The waveguide portions WG1-WG3 have increasing diameters and define first and second steps therebetween, with WG2 being referred to as an intermediate member for the purposes of this discussion. Such a system may be modeled using thin rod theory for compressional waves, which is applicable if the ultrasonic wavelength is much greater than the waveguide diameter.

The reflection coefficient R for such a system may be presented using equation (1) above, where in this case $R_{12}=(Z_2-Z_1)/(Z_2+Z_1)$ and $R_{23}=(Z_3-Z_2)/(Z_3+Z_2)$ are the reflection coefficients on the boundaries 1-2 and 2-3. The acoustic impedances $Z_i=\rho_i v_i S_i$ present the products of medium densities $\rho_i$ to their longitudinal ultrasonic velocities $v_i$ and cross-sectional areas $S_i$. The propagating phase inside WG2 is $\varphi=k_2 l_2$, where $l_2$ is the WG2 length and $k_2=2\pi/\lambda_2=2\pi f/v_2$ is the longitudinal wavenumber in WG2 (f is ultrasonic frequency and $\lambda_2$ is the wavelength inside WG2). The reflection coefficient varies with frequency and this behavior allows one to construct the connection with necessary properties. In addition, the amplitude and phase are functions of the relative properties of the three waveguides.

Figure 29A:
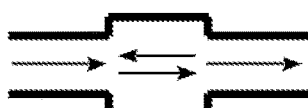
FIGS. 29A-29F illustrate six example discontinuity variations for forming a frequency-dependent reflector.
Figure 29B:
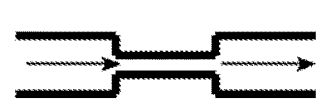
Figure 29C:
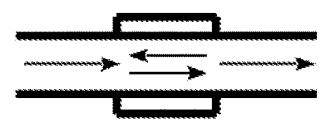

Consider now the case where the same waveguide is used for WG1 and WG3, with the intermediate waveguide WG2 being different from WG1 and WG3. FIGS. 29A-29C, for example, illustrate various types of diameter discontinuities between WG2 and WG1, WG3, with diameter discontinuities respectively represented as a bump (FIG. 29A), a notch (FIG. 29B) and an annular ring of different material fused to the waveguide via, for instance, welding, brazing or soldering (FIG. 29C).

The reflector represented in each of these cases can be configured with desired reflection properties. For example, the reflector may be configured to have maximum transparency for one or more particular frequencies, or a partial reflector with a deterministic percentage of reflected and transmitted amplitudes.

Assuming for the purposes of this example that WG1=WG3 (or $Z_1=Z_3$), then $R_{23}=-R_{12}$ and equation (1) may be simplified to:

$$R = \frac{R_{12}(1 - \exp(2i\varphi))}{1 - R_{12}^2 \exp(2i\varphi)} \quad (20)$$

The reflection coefficient amplitude may vary with frequency so that it changes from 0 at $\varphi=\pi n$ (n=1,2 ... ) to a maximum value of $2|R_{12}|/(1+R_{12}^2)$ at $\varphi=\pi/2+\pi n$. The resonant frequencies $f_n$ may be determined from the minima of the reflection coefficient using the equation $\varphi=\pi n$ (n=1, 2 ... ) or, in other words, the reflector length may be equal to an integer number of half-wavelengths:

$$f_n = \frac{v_2 n}{2 l_2} \quad (21)$$

In the case of a diameter discontinuity. the acoustic impedance $Z_i \sim S_i$ and $R_{12}=(d_2^2-d_1^2)/(d_2^2+d_1^2)$ where $d_i$ are the waveguide diameters. In the case of a solder blob discontinuity (illustrated in FIG. 29C). the acoustic impedance may be calculated as $Z_2=\sqrt{(\rho_1 S_1+\rho_b S_b)(E_1 S_1+E_b S_b)}$ where $E_{1,b}$ are the Young's moduli of the waveguide and annular ring and $\rho_b$ and $S_b$ are the annular ring density and cross-section area. As such, choosing reflector parameters such as width/diameter, length, material, etc., the frequency-dependent properties of the discontinuity may be determined.

Figure 30:
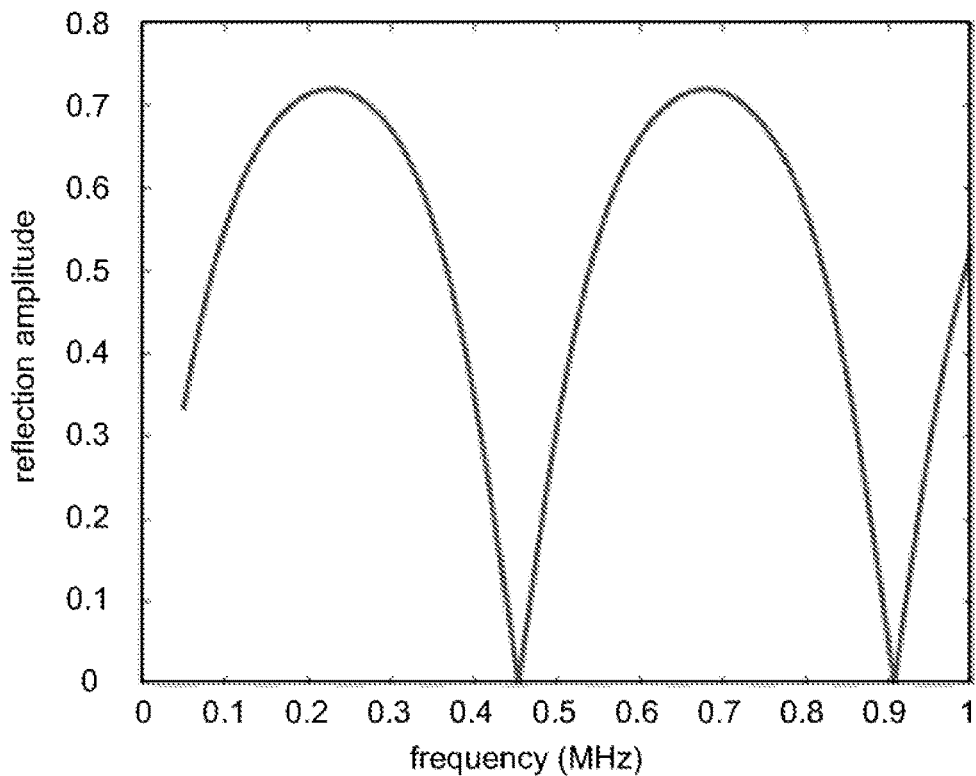
FIG. 30 illustrates reflection amplitude over a range of frequencies for an example frequency-dependent reflector.

FIG. 30, for example, illustrates an example reflection coefficient versus ultrasonic frequency for a 4 mm length silver solder annular ring having a diameter that is about three times larger than a steel waveguide diameter. For example, at an ultrasonic frequency f=0.4 MHz, the reflection coefficient |R|=0.5 (i.e., about 50% of the signal reflects), but at frequency f=0.455 MHz the soldering blob is substantially transparent (i.e., |R|=0).

Consider now the case of a thin WG1 and a thick WG3, which represents, for example, a scenario where an ultrasonic signal needs to be transmitted a comparatively long distance through a complicated geometry, which may be performed using a relatively thin and flexible waveguide WG1. Another advantage of a thin waveguide is a general absence of frequency dispersion and low signal distortion. On the other hand, the measurement area may be a harsh environment necessitating the use of a relatively thick and sturdy waveguide portion for WG3 to satisfy structural restrictions. For such connections between waveguides, most of an ultrasonic signal may reflect from the connection point, and may depend at least in part on a cross-sectional area ratio. Using an intermediate (matching) member or waveguide (WG2) may instead allow reflections to be minimized for certain frequencies as well as increase signal amplitude in a measuring region.

Thus, for example, to minimize reflections, one may solve the equation $R_{12}+R_{23} \exp(2i\varphi)=0$. Because of $R_{12,23}>0$ this may occur at $\exp(2i\varphi)=-1$ or at $l_2=\lambda_2/4$. As such, to minimize reflections in this situation, the length of WG2 length is desirably proportional to a quarter wavelength.

The next condition is $R_{12}=R_{23}$ which solution gives conditions for acoustic impedances as $Z_2=\sqrt{Z_1 Z_3}$. In the case of the same material this condition transforms to the diameter of the matching WG2: $d_2=\sqrt{d_1 d_3}$. So, if the diameter of the intermediate WG2 is the geometric average of WG1 and WG3, at certain frequencies (e.g., quarter wavelength conditions) the thin-thick waveguide connection will be substantially transparent.

It will therefore be appreciated that in some embodiments, it may be desirable to control one or more drive frequencies for an active mechanical waveguide in connection with the configuration of one or more frequency-dependent reflectors defined along the length of the waveguide to provide a controlled reflection response for each frequency-dependent reflector. In some embodiments, for example, it may be desirable to control a drive frequency to effectively render a frequency-dependent reflector substantially transparent, i.e., to reduce or otherwise minimize the receipt of reflections from the frequency-dependent reflector in response to ultrasonic stress waves propagated through the waveguide.

A frequency-dependent reflector, for the purposes of this discussion, may represent various types of structures within or otherwise coupled to an active mechanical waveguide. and which are capable of generating reflections in the active mechanical waveguide in response to ultrasonic mechanical stress waves introduced into the waveguide. FIGS. 29A-C, discussed above, represent various types of reflectors referred to herein as reflection points, which are generally intentionally-defined points along a waveguide in which reflections are generally desired, at least in some circumstances. Reflection points may be used, for example, to define a sensing area along a waveguide, as discussed above.

Figure 29D:
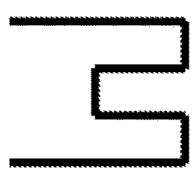
Figure 29E:
Figure 29F:

In addition, FIGS. 29D-F represent various types of reflectors that may be created at the end of a waveguide. FIG. 29D, for example, illustrates an end-type reflector in which a hole or shaft extends inwardly from an end surface of the waveguide. Similarly, FIG. 29E illustrates an end-type reflector similar to that of FIG. 29D, but where the hole or shaft is filled with a different material having known material properties (e.g., ceramic), and which may be useful in environments where there is a risk of unknown materials filling the hole or shaft in operation. FIG. 29F illustrates another end-type reflector that is internal to a cylindrical waveguide, whereby the waveguide is cylindrical with a hollow interior and the reflector is formed by a stepped configuration at the end of and internal to the waveguide. Similar to the reflector of FIG. 29E, the reflector of FIG. 29F is effectively protected from becoming fouled with unknown materials from the environment surrounding the waveguide. It will also be appreciated that other end-type reflectors may be used, e.g., using a stepped-up or stepped-down configuration illustrated in FIG. 28 where one of waveguide WG1 or WG3 forms a portion of the main waveguide and the other of waveguide WG1 or WG3 forms a tip at the end of the main waveguide.

Figure 31:
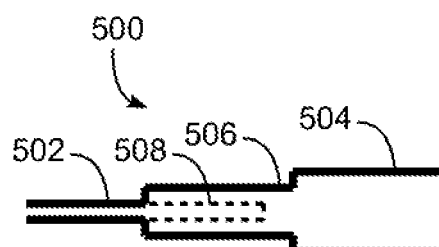
FIG. 31 illustrates an example joint reflector.

Other types of frequency-dependent reflectors may include reflectors created by joints, support couplings, and seals, among others. FIG. 31, for example, illustrates a cross-sectional view of an example joint-type reflector 500 formed by a coupling of first and second members 502, 504 of a waveguide. Second member 504 includes a step forming an intermediate member 506 of reduced diameter, and first member 502, which has a smaller diameter than intermediate member 506, is secured into a channel 508 formed in an end of intermediate member 506, thereby forming another step, such that the overall waveguide has a similar configuration to the three waveguide and two step arrangement discussed above in connection with FIG. 28.

Figure 32:
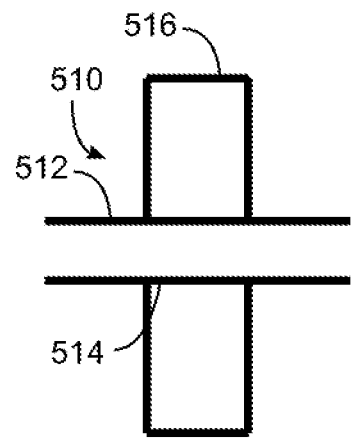
FIG. 32 illustrates an example support or seal reflector.

In addition, FIG. 32 illustrates a cross-sectional view of another example reflector 510 including a waveguide member 512 that projects through an aperture 514 formed in a member 516. This configuration is representative of a support-type reflector that couples a waveguide and a waveguide support, e.g., similar to the arrangements illustrated in FIG. 7 (discussed above). This configuration is also representative of a seal-type reflector, where a seal is formed between waveguide member 512 and member 516, e.g., where member 516 is representative of a body that forms a seal for an environment.

The various frequency-dependent reflectors discussed above will be appreciated to be merely examples of the potential geometries and configurations that may be used in various embodiments. An innumerable number of other potential geometries and configurations may be used in other embodiments, however, so the invention is not limited to the particular geometries and configurations illustrated herein.

As noted above. any of the aforementioned reflectors may be configured to be substantially transparent at one or more frequencies, or to otherwise provide a deterministic percentage of reflected and transmitted amplitudes. Such reflection responses may be configured based upon one or more of geometry and material properties. For example, a reflection response may be configured based upon the geometry of an intermediate member defined by two steps in a reflector. The geometry may be based, for example, on any or all of a length, a width, a diameter (which in some instances may also be considered to represent a width of a cylindrical member), a circumference, a radius, a cross-sectional area, etc. A reflection response may also be configured based upon the material properties of one or more materials in a reflector, e.g., based upon one or more of modulus and density of a material in a reflector.

A reflection response may also be considered to be configurable based upon frequency and attenuation or reflectance, where frequency refers to the frequency at which a dip in reflection amplitude occurs (e.g., the frequency at which the amplitude is at a minimum in FIG. 30), and where attenuation or reflectance refers to the relative amount of attenuation or level of reflectance (e.g., the amount of the minimum amplitude in FIG. 30). It will be appreciated that geometry and material properties may generally control the frequency at which a reflector may be substantially transparent, while material properties and other loss factors (e.g., due to damping or other structures in contact with a reflector) may generally control the attenuation or reflectance of a reflector at that frequency.

It will also be appreciated that multiple frequency-dependent reflectors formed along a waveguide may be configured differently to respond to different frequencies, e.g., to be substantially transparent at different frequencies. By doing so, a controller or other control logic may be configured to control the frequency or frequencies of an ultrasonic drive signal to render certain reflectors substantially transparent at different times or for different purposes. For example, it may be desirable to configure reflectors that are not associated with sensing regions to be substantially transparent to a desired drive frequency. In addition, it may be desirable to configure multiple reflectors for different sensing regions to be substantially transparent to different drive frequencies such that those different drive frequencies may be used concurrently or individually to measure different environmental conditions or to measure an environmental condition in different sensing regions. By doing so, identification of desired or expected reflections in a response signal may be simplified due to a reduced number of reflections in the response signal.

Therefore, in some embodiments, control logic may be configured to drive an ultrasonic transducer at a plurality of frequencies to render different frequency-dependent reflectors of a waveguide substantially transparent to different drive frequencies of the ultrasonic transducer, and to determine a value of an environmental condition based upon an ultrasonic signal sensed from the waveguide when at least one of the plurality of frequency-dependent reflectors is substantially transparent to at least one of the different drive frequencies of the ultrasonic transducer.

Figure 33:
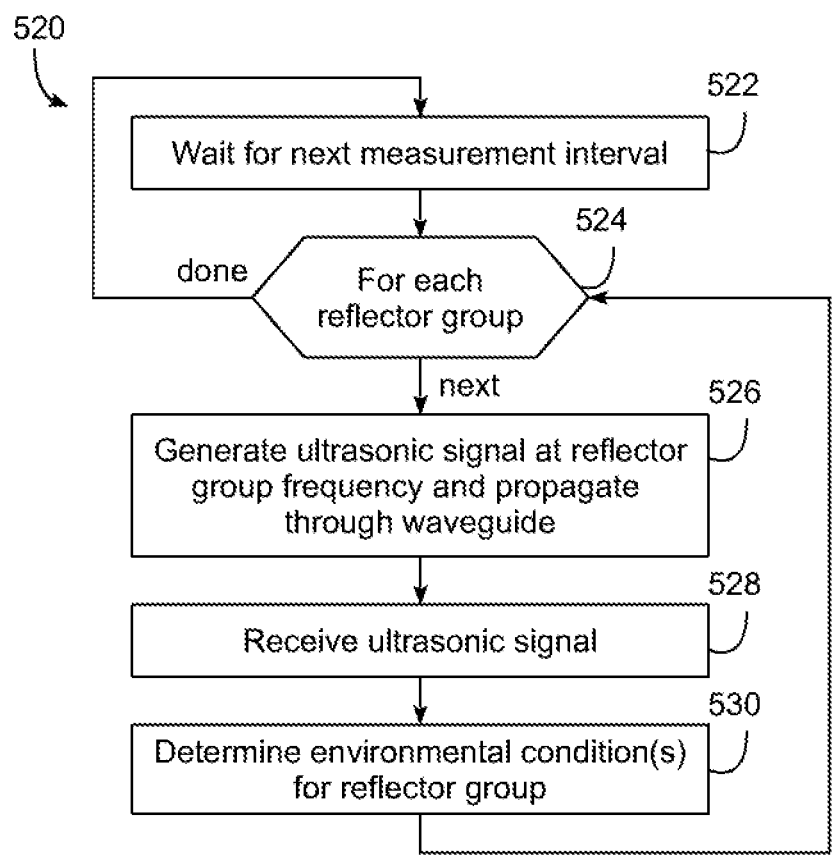
FIG. 33 is a flowchart illustrating an example sequence of operations for monitoring a sensor with frequency-dependent reflectors consistent with the invention.

FIG. 33, for example, illustrates one example sequence of operations 520 for measuring environmental conditions in an active mechanical waveguide having multiple reflector "groups," and by individually driving an ultrasonic transducer at different frequencies. Each reflector group, in this regard, may be considered to include one or more reflectors that share a similar reflection response to a particular drive frequency (e.g., all are substantially transparent, or all are not substantially transparent). In sequence 520, different ultrasonic signals are propagated through a waveguide sequentially, and different environmental conditions are sensed in response to each ultrasonic signal. Thus, at each measurement interval (block 522), a loop is initiated for each reflector group in block 524. For each reflector group, block 526 generates an ultrasonic signal at a particular reflector group frequency (e.g., a frequency at which the reflectors in the reflector group are substantially transparent, or a frequency at which reflectors in another reflector group are substantially transparent), and the ultrasonic signal is propagated through the waveguide. Block 528 then receives the ultrasonic signal, and block 530 determines one or more environmental conditions for the reflector group. Control then returns to block 524 to process other reflector groups, and once all reflector groups are processed, control returns to block 522 to wait for the next measurement interval.

As an example of the operation of sequence 520, consider an active waveguide having a first pair of reflection points to define a first sensing region and a second pair of reflection points to define a second sensing region. Consider also that the first pair of reflection points are configured to be substantially transparent at a first frequency and the second pair of reflection points are configured to be substantially transparent at a second frequency. Using sequence 520, the first pair of reflection points could be considered to be a first reflector group, and the second pair of reflection points could be considered to be a second reflector group. By generating an ultrasonic signal having the second frequency as the drive frequency, the second pair of reflection points would be substantially transparent, so the reflections generated by the first pair of reflection points could be analyzed to sense an environmental condition in the first sensing region without having to identify or ignore reflections from the second pair of reflection points. Likewise, by generating an ultrasonic signal having the first frequency as the drive frequency, the first pair of reflection points would be substantially transparent, so the reflections generated by the second pair of reflection points could be analyzed to sense an environmental condition in the second sensing region without having to identify or ignore reflections from the first pair of reflection points.

Figure 34:
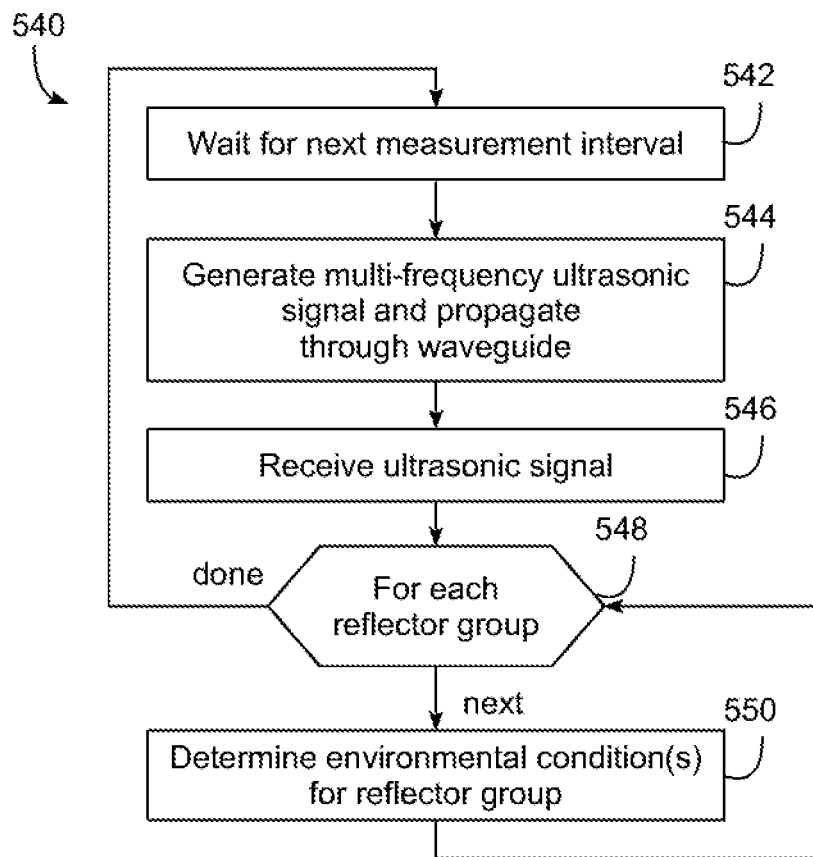
FIG. 34 is a flowchart illustrating another example sequence of operations for monitoring a sensor with frequency-dependent reflectors consistent with the invention.

As noted above, FIG. 33 individually drives an ultrasonic transducer at each of a plurality of frequencies. In other embodiments, however, an ultrasonic transducer may be concurrently driven at a plurality of frequencies, with separate analysis performed for the responses of reflectors to each of the different frequencies. FIG. 34, for example, illustrates an example sequence of operations 540 that concurrently drives an ultrasonic transducer at multiple drive frequencies. At each measurement interval (block 542), a multi-frequency ultrasonic signal is generated and propagated through the waveguide (block 544), the response ultrasonic signal is received (block 546), and then a loop is initiated in block 548 to determine one or more environmental conditions for each reflector group, e.g., by bandpass filtering at the different drive frequencies to isolate out reflections associated with reflectors of a particular group. Since certain reflectors may be substantially transparent in response to different drive frequencies, no reflections will generally be present from those reflectors in response to drive frequencies at which they are substantially transparent.

Therefore, in some embodiments the drive frequency or frequencies of an ultrasonic transducer may be selected in connection with configuring frequency-dependent reflectors to selectively render the frequency-dependent reflectors substantially transparent.

Figure 35:
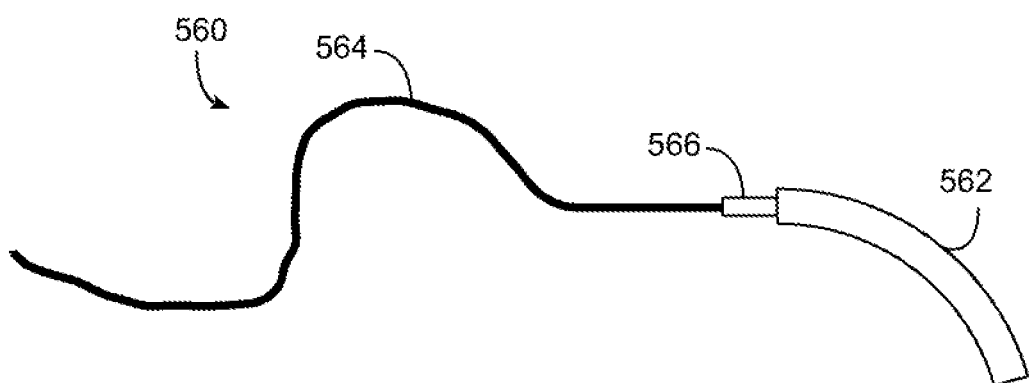
FIG. 35 is an illustration of an example active mechanical waveguide sensor with a flexible lead consistent with some embodiments of the invention.

FIG. 35 also illustrates another active waveguide sensor 560 utilizing a frequency-dependent reflector for coupling a waveguide 562 to a substantially thinner and/or more flexible lead-in 564. The frequency-dependent reflector, for example, may include an intermediate member 566 that, similar to the configuration discussed above in connection with FIG. 31, is configured to render the joint between waveguide 562 and lead-in 564 substantially transparent to one or more drive frequencies used to sense environmental conditions with waveguide 562. In some embodiments, the intermediate member 566 may be integrally formed with the waveguide 562 or with lead-in 564, although the invention is not so limited.

The use of lead-in 564 may enable ultrasonic energy to be delivered to and measured from waveguide 562, yet may also be easily bent and curved to be routed through bends, access passages and holes in the environment (e.g., an engine) to enable pragmatic installation of the sensor. Thus, for example, in some embodiments, waveguide 562 may be a first member that comprises a sensor portion including one or more reflection points defining one or more sensing regions, lead-in 564 may be a second member and may be substantially more flexible and/or thinner than waveguide 562, and a frequency-dependent reflector may be defined in part by intermediate member 566 that has a width that is between that of waveguide 562 and lead-in 564.

In addition, as noted above in connection with FIG. 32. it may be desirable to configure supports of a waveguide to incorporate frequency-dependent reflectors. Thus, some embodiments may utilize a configuration similar to FIG. 7, but without the use of damping devices between a waveguide and each support (e.g., without any or all of bushings 206, masses 208 and support member damping 209). A sensor in such a configuration may include an active mechanical waveguide including an ultrasonically-transmissive material and one or more reflection points defined along a length of the waveguide to define one or more sensing regions along the waveguide, a plurality of support members supporting the waveguide along at least a portion of the length of the waveguide, with each defining a frequency-dependent reflector, an ultrasonic transducer that propagates ultrasonic stress waves through the waveguide using a drive frequency to which the frequency-dependent reflector of at least one of the support members (and optionally, multiple or all support members) is substantially transparent, and control logic that controls the drive frequency for the ultrasonic transducer to render the frequency-dependent reflector of the at least one support member substantially transparent.

It has been found, in particular, that damping devices such as described above in connection with FIG. 7 may be beneficial in applications subject to high vibration as damping may improve the fatigue/vibration life of a sensor. However, in other applications, e.g., applications without high vibration, it may still be advantageous to support a waveguide through multiple supports similar the arrangement of FIG. 7, and utilize frequency-dependent reflectors to minimize loss of energy and the occurrence of undesirable reflections. The supports may be configured to have a high stiffness (e.g., using a metal, ceramic or other material fused to or in contact with the waveguide, e.g., in a configuration similar to that illustrated in FIG. 32), but dimensioned and otherwise configured to render the supports substantially transparent to one or more drive frequencies used in sensing. Further, in additional applications vibration may not be a concern, so high stiffness supports may not be required, and flexible supports may be used to support a waveguide without causing undesirable reflections or energy loss, but also without employing any damping.

CONCLUSION

While the present invention has been illustrated by a description of the various embodiments and examples, and while these embodiments have been described in considerable detail, it is not the intention of the applicants to restrict or in any way limit the scope of the appended claims to such detail. Sensors and sensing methods consistent with the invention may be used (but are not necessarily required for use) in sensing environments that conventional sensors and sensing methods generally provide inaccurate results and/or fail completely. Embodiments consistent with the invention may be utilized in a variety of applications where the sensing locations typically are too harsh for conventional sensors and/or sensing methods. Harsh sensing environments typically include one or more extreme environmental conditions that cause inaccurate readings and/or failure of conventions sensors, extreme environmental conditions generally problematic for conventional sensors include, for example, high temperature, high pressure, high strain. high vibration, wide variations in temperature during operation (i.e. broad temperature range), wide variations in pressure during operation (i.e. broad pressure range), etc. As such, sensors and sensing methods consistent with the invention may be utilized in such harsh sensing environments including, for example, high temperature, pressure, vibration, and/or strain locations in engines (e.g. combustion chambers of aero gas turbine engines), high temperature, pressure, vibration, and/or strain locations in industrial machinery, etc.

Furthermore, embodiments consistent with the invention may be used in other applications (including in non-harsh environments where it may be desirable to make average temperature, strain, and other environmental measurements over long curvilinear distances, or where it may be desirable to make multiple measurements using the same sensor.

As sensors and sensing methods consistent with the invention may transmit ultrasonic signals through wires of substantial length, controllers and or other devices used to analyze the ultrasonic signals to determine a measurement of one or more environmental conditions of a harsh sensing location may be remote from the harsh sensing location thereby increasing the reliability of components that may be particularly sensitive to the environmental conditions of the harsh sensing location. Therefore, sensors and sensing methods consistent with the invention may be utilized in a wide variety of applications to provide improved sensors and sensing methods as compared to conventional sensors and sensing methods. In addition, sensors and sensing methods consistent with the invention may be utilized in a wide variety of applications where conventional sensing technology is unreliable, inaccurate and/or inoperable. Thus, the invention in its broader aspects is therefore not limited to the specific details and representative apparatuses shown and described. Accordingly, departures may be made from such details without departing from the spirit or scope of applicants' general inventive concept.

What is claimed is:

1. A sensor for sensing an environmental condition in an environment, comprising:
   an active mechanical waveguide including an ultrasonically-transmissive material; and
   control logic coupled to the active mechanical waveguide and configured to drive the waveguide with ultrasonic energy, process an ultrasonic signal propagated through the waveguide in response to the ultrasonic energy, track a phase derivative of the ultrasonic signal, and determine a value for an environmental condition based upon the tracked phase derivative of the ultrasonic signal;
   wherein the active mechanical waveguide includes a plurality of reflection points defined along a length of the waveguide to define a plurality of sensing regions along the waveguide, and wherein the control logic is configured to determine a value for the environmental condition for each of the plurality of sensing regions based upon the tracked the phase derivative of the ultrasonic signal.

2. The sensor of claim 1, wherein the control logic is further configured to determine a phase inflection point frequency from the tracked phase derivative, and determine the value for the environmental condition based upon the tracked phase derivative of the ultrasonic signal by determining the value for the environmental condition based upon the determined phase inflection point frequency.

3. A method of sensing an environmental condition in an environment, the method comprising:
   driving an active mechanical waveguide including an ultrasonically-transmissive material with ultrasonic energy;
   processing an ultrasonic signal propagated through the waveguide in response to the ultrasonic energy;
   tracking a phase derivative of the ultrasonic signal; and
   determining a value for an environmental condition based upon the tracked phase derivative of the ultrasonic signal;
   wherein the active mechanical waveguide includes a plurality of reflection points defined along a length of the waveguide to define a plurality of sensing regions along the waveguide, and wherein the method further comprises determining a value for the environmental condition for each of the plurality of sensing regions based upon the tracked the phase derivative of the ultrasonic signal.

4. The method of claim 3, further comprising:
   determining a phase inflection point frequency from the tracked phase derivative; and
   determining the value for the environmental condition based upon the tracked phase derivative of the ultrasonic signal by determining the value for the environmental condition based upon the determined phase inflection point frequency.

5. A sensor for sensing an environmental condition in an environment, comprising:
   an active mechanical waveguide including an ultrasonically-transmissive material and a plurality of reflection points defined along a length of the waveguide to define a plurality of sensing regions along the waveguide, wherein the plurality of reflection points includes first and second reflection points defining a first sensing region of the plurality of sensing regions that is disposed between the first and second reflection points and that has a resonant frequency that varies at least in part based upon the environmental condition; and
   control logic coupled to the active mechanical waveguide and configured to drive the waveguide to track a plurality of resonant frequencies of the waveguide, wherein the control logic is further configured to determine a value of the environmental condition for the first sensing region by determining a first resonant frequency among the plurality of resonant frequencies that is associated with the first sensing region.

6. The sensor of claim 5, wherein the value is a first value, and wherein the control logic is further configured to determine a second value of the environmental condition for a second sensing region among the plurality of sensing regions by determining a second resonant frequency among the plurality of resonant frequencies.

7. The sensor of claim 6, wherein the control logic includes a positive feedback loop that drives the waveguide using the plurality of resonant frequencies.

8. The sensor of claim 5, further comprising:
an ultrasonic transducer coupled to the waveguide and configured to propagate ultrasonic stress waves through the waveguide; and
a receiver coupled to the waveguide and configured to receive an ultrasonic signal propagated through the waveguide in response to the ultrasonic stress waves generated by the ultrasonic transducer;
wherein the control logic is coupled to the ultrasonic transducer and the receiver and is configured to determine a value of the environmental condition for each of the plurality of sensing regions based upon the plurality of resonant frequencies of the received ultrasonic signal.

9. The sensor of claim 5, wherein each of the plurality of resonant frequencies is non-harmonic relative to others of the plurality of resonant frequencies.

10. A method of sensing an environmental condition in an environment, the method comprising:
tracking a plurality of resonant frequencies of an active mechanical waveguide including an ultrasonically-transmissive material and a plurality of reflection points defined along a length of the waveguide to define a plurality of sensing regions along the waveguide, wherein the plurality of reflection points includes first and second reflection points defining a first sensing region of the plurality of sensing regions that is disposed between the first and second reflection points and that has a resonant frequency that varies at least in part based upon the environmental condition; and
sensing the environmental condition at one or more of the plurality of sensing regions based upon the tracked plurality of resonant frequencies, including determining a value of the environmental condition for the first sensing region by determining a first resonant frequency among the plurality of resonant frequencies that is associated with the first sensing region.

11. The method of claim 10, wherein the value is a first value, and wherein sensing the environmental condition further includes determining a second value of the environmental condition for a second sensing region among the plurality of sensing regions by determining a second resonant frequency among the plurality of resonant frequencies.

12. The method of claim 11, wherein tracking the plurality of resonant frequencies includes driving the waveguide in a positive feedback loop using the plurality of resonant frequencies.

13. The method of claim 10, wherein the active mechanical waveguide includes an ultrasonic transducer configured to propagate ultrasonic stress waves through the waveguide and a receiver configured to receive an ultrasonic signal propagated through the waveguide in response to the ultrasonic stress waves generated by the ultrasonic transducer.

14. The method of claim 10, wherein each of the plurality of resonant frequencies is non-harmonic relative to others of the plurality of resonant frequencies.

15. A sensor for sensing an environmental condition in an environment, comprising:
an active mechanical waveguide including a wire formed of an ultrasonically-transmissive material and a frequency-dependent reflector defined by a discontinuity along a length of the wire;
an ultrasonic transducer coupled to the waveguide and configured to propagate ultrasonic stress waves through the waveguide; and
control logic coupled to the ultrasonic transducer and configured to control a drive frequency for the ultrasonic transducer to render the frequency-dependent reflector substantially transparent.

16. A sensor for sensing an environmental condition in an environment, comprising:
an active mechanical waveguide including an ultrasonically-transmissive material and a plurality of reflection points defined along a length of the waveguide to define a plurality of sensing regions along the waveguide, wherein the plurality of reflection points includes first and second reflection points defining a first sensing region of the plurality of sensing regions that is disposed between the first and second reflection points;
a plurality of support members supporting the waveguide along at least a portion of the length of the waveguide, wherein each support member defines a frequency-dependent reflector;
an ultrasonic transducer coupled to the waveguide and configured to propagate ultrasonic stress waves through the waveguide using a drive frequency to which the frequency-dependent reflector of at least one support member is substantially transparent; and
control logic coupled to the ultrasonic transducer and configured to determine a value of the environmental condition for the first sensing region while controlling the ultrasonic transducer to propagate the ultrasonic stress waves through the waveguide using the drive frequency.

* * * * *